(12) United States Patent
Yanai et al.

(10) Patent No.: US 8,976,459 B2
(45) Date of Patent: Mar. 10, 2015

(54) ZOOM LENS AND IMAGE PICKUP APPARATUS USING THE SAME

(71) Applicant: Olympus Imaging Corp., Tokyo (JP)

(72) Inventors: Tetsuya Yanai, Tokyo (JP); Mayu Miki, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 13/727,847

(22) Filed: Dec. 27, 2012

(65) Prior Publication Data
US 2013/0169846 A1    Jul. 4, 2013

(30) Foreign Application Priority Data
Dec. 28, 2011    (JP) .................................. 2011-289075

(51) Int. Cl.
*G02B 15/14* (2006.01)
*H04N 5/225* (2006.01)
*G02B 15/173* (2006.01)

(52) U.S. Cl.
CPC ................ *G02B 15/14* (2013.01); *H04N 5/225* (2013.01); *G02B 15/173* (2013.01)
USPC ............................. 359/686; 359/676; 348/340

(58) Field of Classification Search
CPC ...... G02B 15/14; G02B 15/173; G02B 15/20; H04N 5/225
USPC ................... 359/676, 683, 686, 687; 348/340
See application file for complete search history.

(56) References Cited

U.S. PATENT DOCUMENTS 8,159,759 B1 *    4/2012    Kim .............................. 359/687

FOREIGN PATENT DOCUMENTS

JP        2004-219782        8/2004

* cited by examiner

*Primary Examiner* — David N Spector
(74) *Attorney, Agent, or Firm* — Kenyon & Kenyon LLP

(57) ABSTRACT

A zoom lens comprises in order from an object side, a first lens unit having a positive refractive power, and at the time of zooming from a wide angle end to a telephoto end, the first lens unit moves, and the zoom lens satisfies the following conditional expression (1).

$$FNO(W) < 1.64 \qquad (1)$$

where,
FNO(W) denotes an F-number of the zoom lens at the wide angle end.

29 Claims, 18 Drawing Sheets

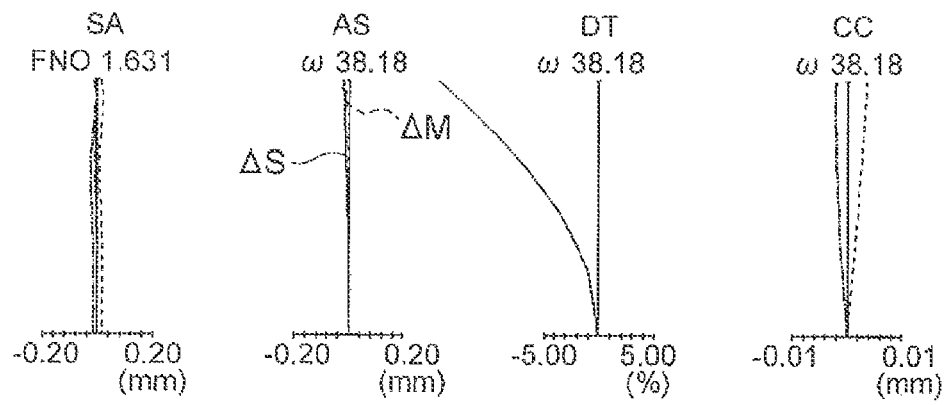
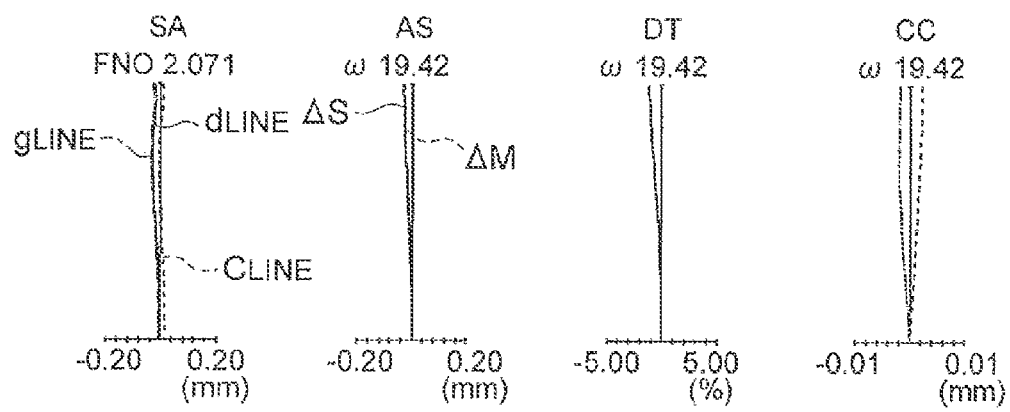
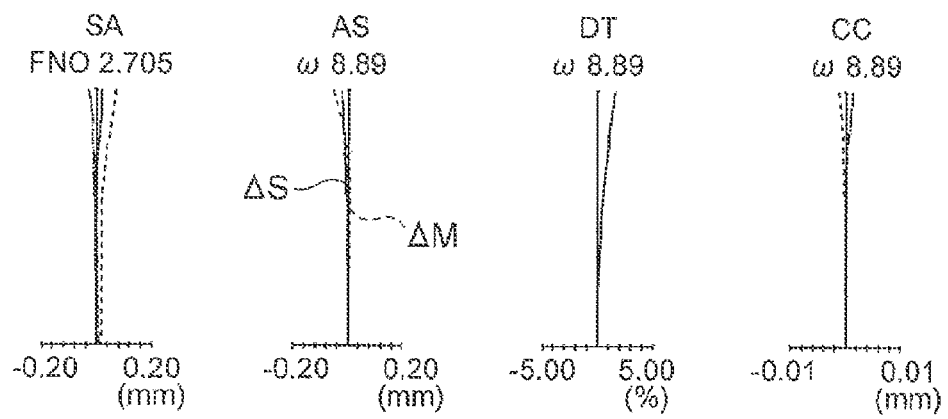

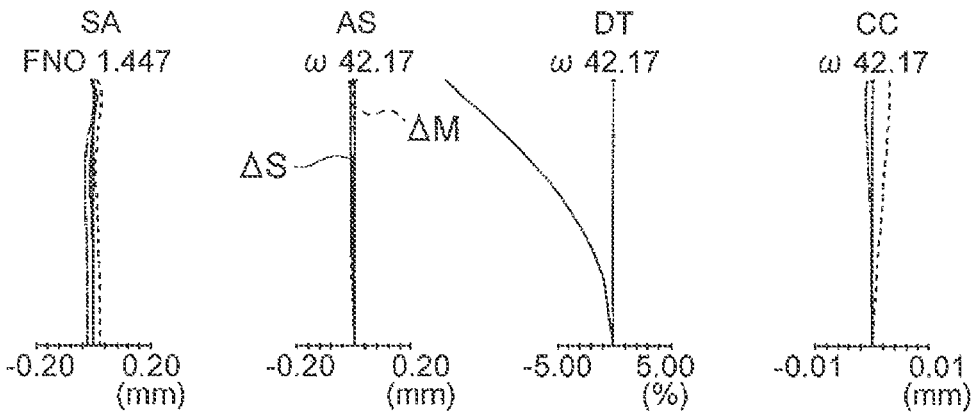
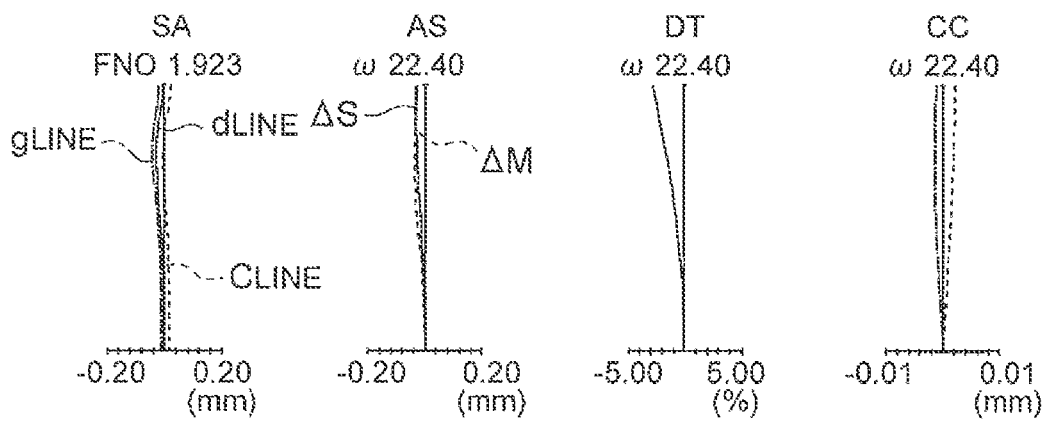
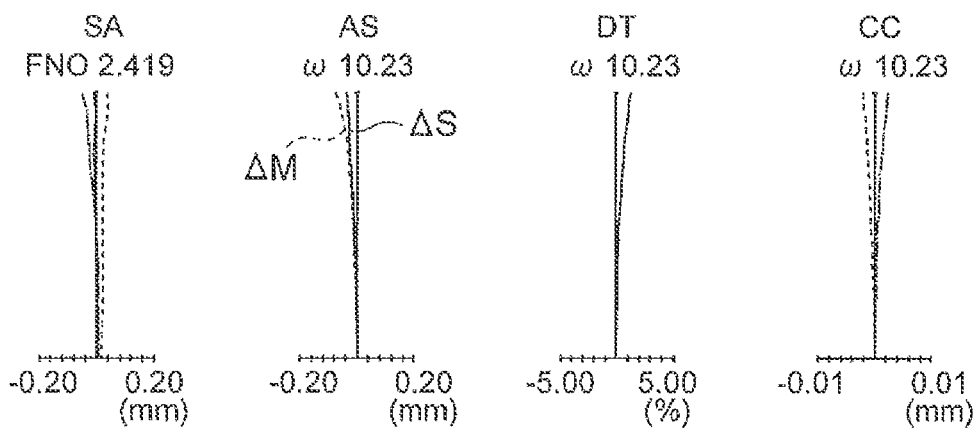

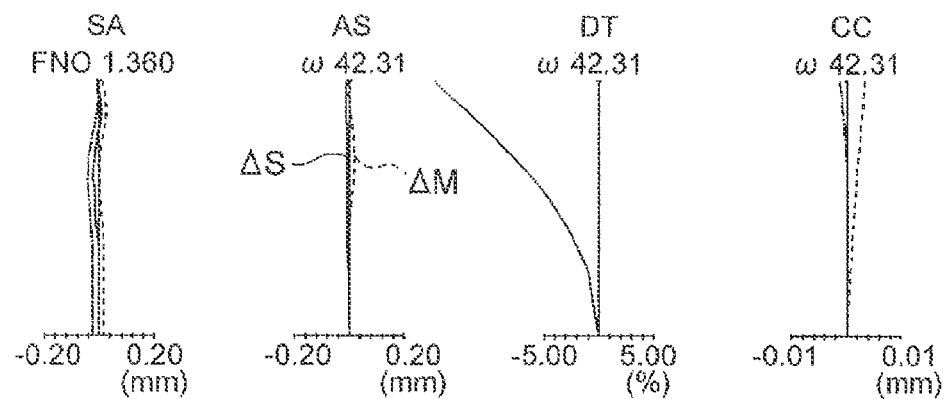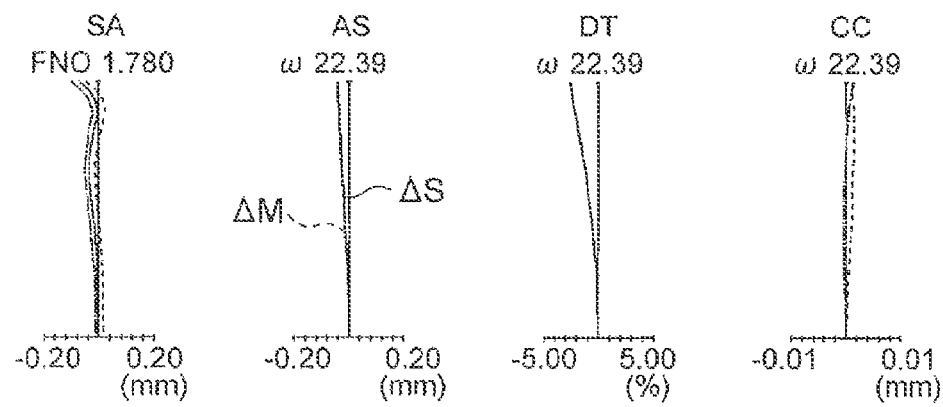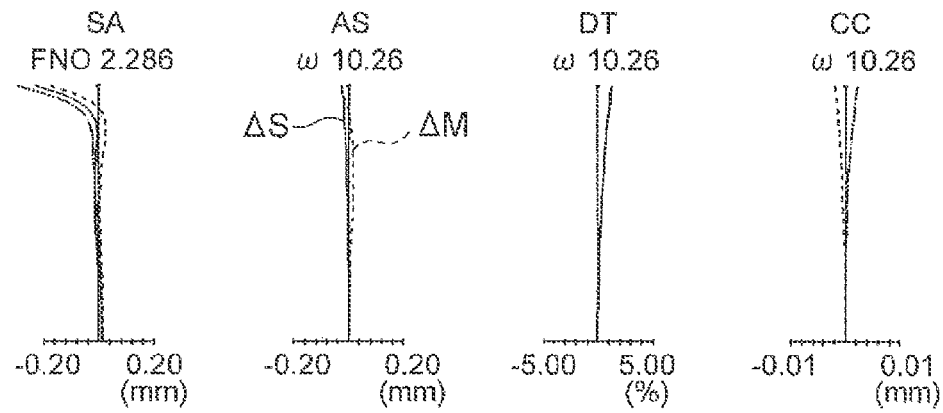

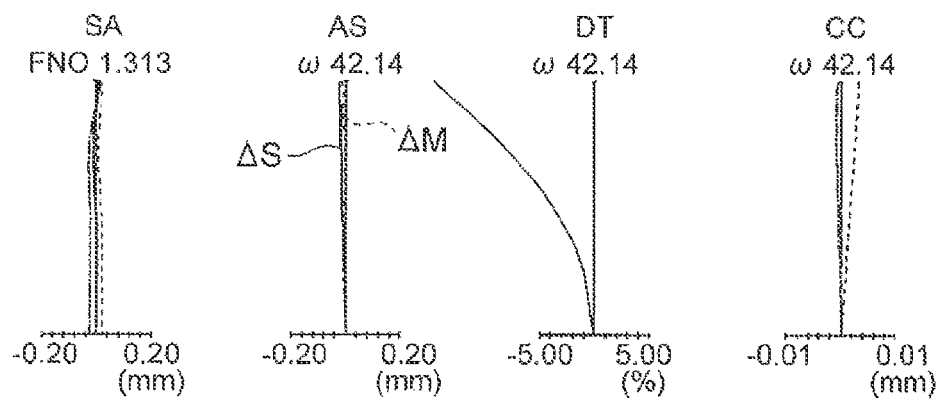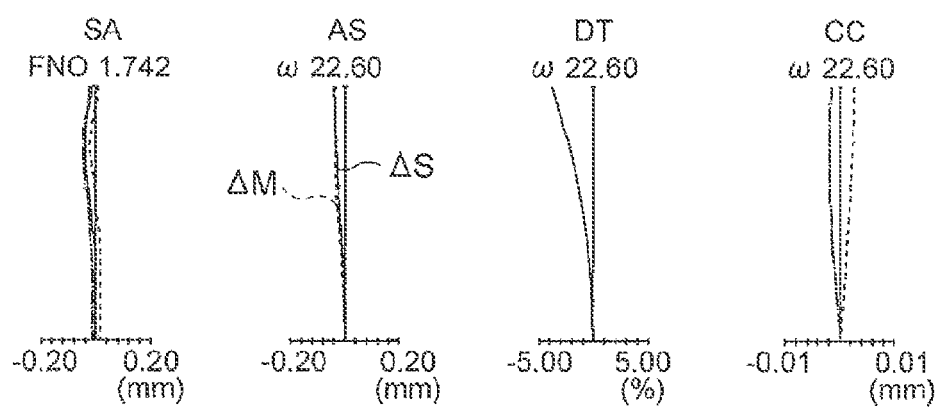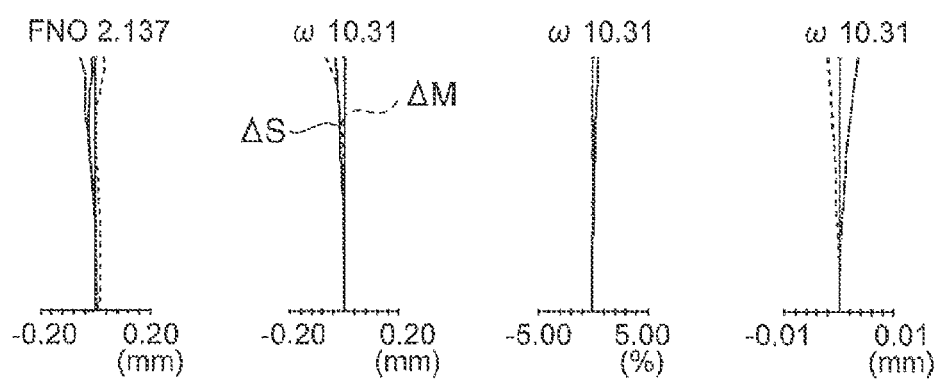

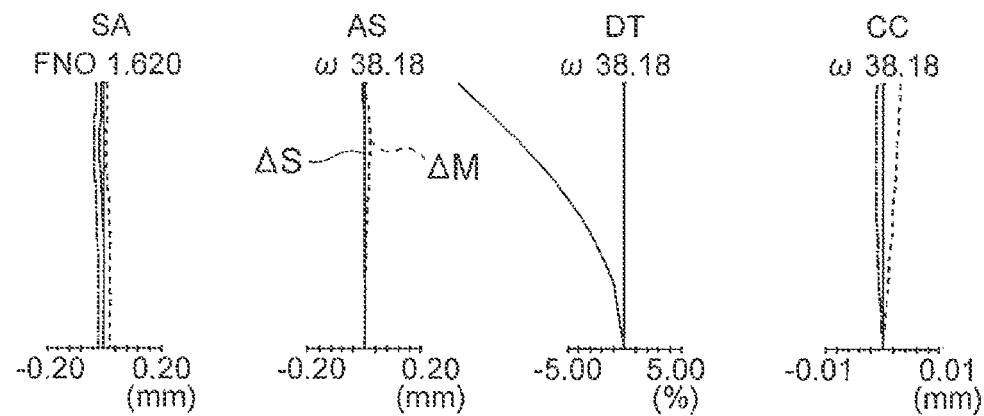
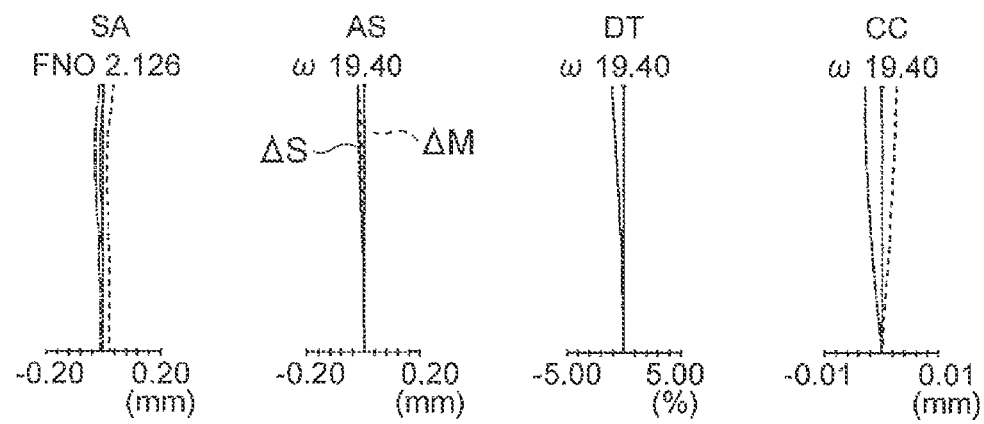
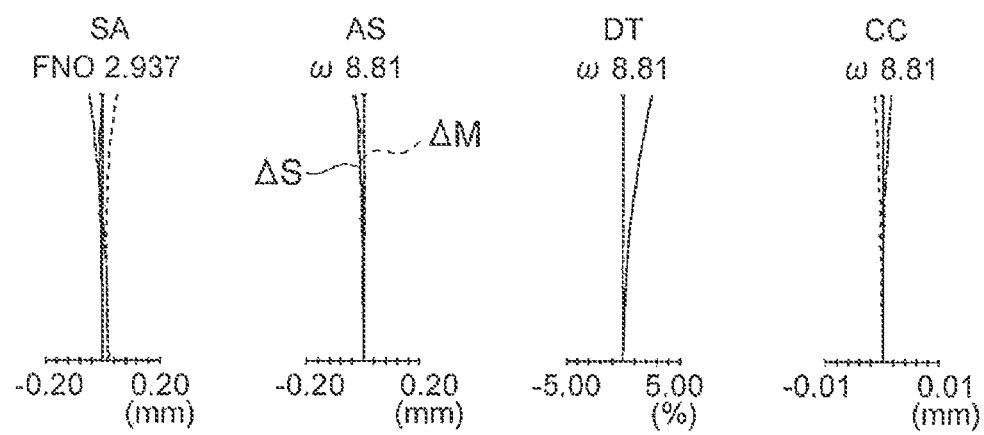

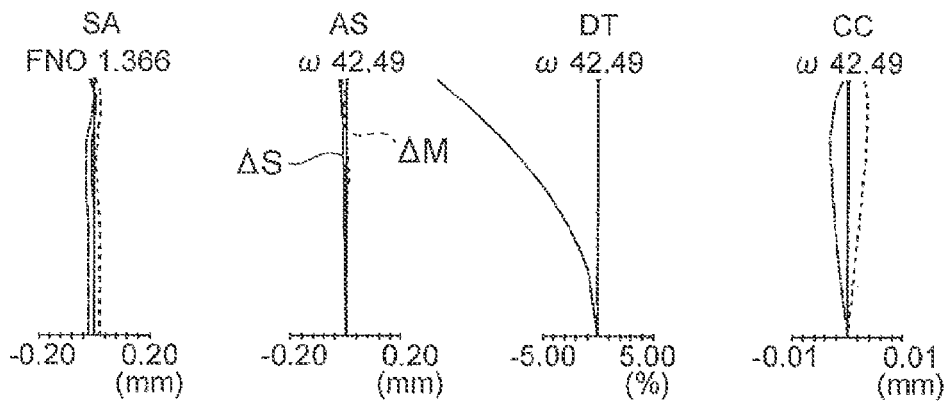
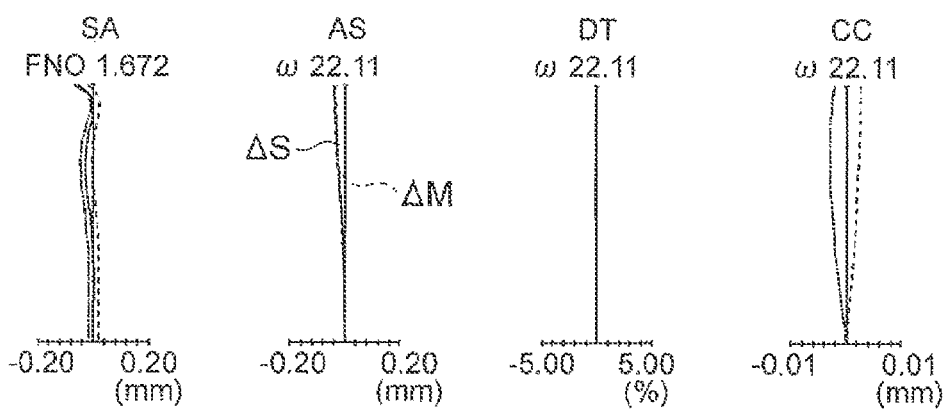
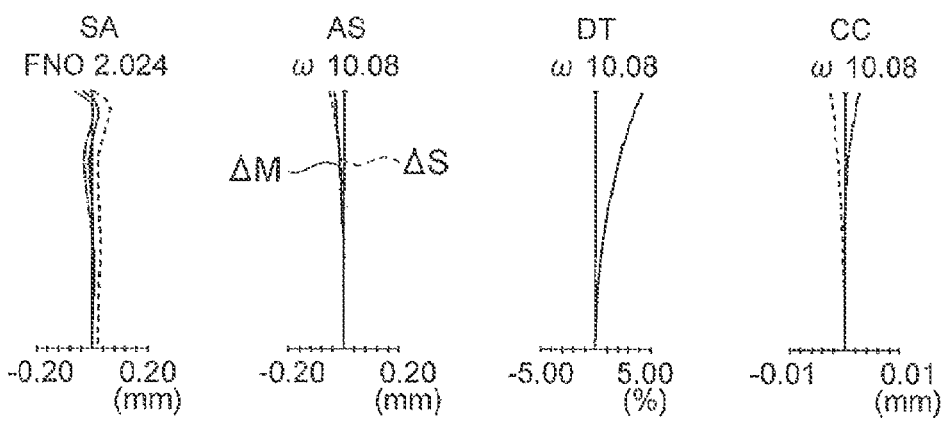

ZOOM LENS AND IMAGE PICKUP APPARATUS USING THE SAME

CROSS-REFERENCE TO RELATED APPLICATION

The present application is based upon and claims the benefit of priority from the prior Japanese Patent Application No. 2011-289075 filed on Dec. 28, 2011; the entire contents of which are incorporated herein by reference.

BACKGROUND OF THE INVENTION

1. Field of the Invention

The present invention relates to a zoom lens and an image pickup apparatus using the same, and in particular, to a zoom lens and an image pickup apparatus which are suitable for a compact digital camera.

2. Description of the Related Art

In recent years, digital cameras in which, an arrangement has been made such that an object is photographed by using a solid image pickup element such as a CCD (Charge Coupled Device) and a CMOS (Complementary Metal Oxide Semiconductor) have been main stream, replacing a silver-salt film camera. Furthermore, such digital cameras have been used in a wide range of categories from a high-function type for professional use to a portable popular type.

A user of such digital camera of the popular type seeks to enjoy photography by capturing readily various scenes anytime and anywhere. Therefore, a small-size product, particularly a slim digital camera, which can be accommodated easily in a pocket of clothes or a bag and carried conveniently, has been preferred. Therefore, further small-sizing of a taking lens system has been sought.

Furthermore, in order that capturing can be carried out also with high intensity, a digital camera which carries out image processing such as widening a sensitivity area of dynamic range has also been proposed, and photography in which capture conditions are not to be selected has become possible. In such camera, for photography including photography at dark places, electronic correction of intensity is possible to certain extent, and furthermore, by adopting a fast lens with a large lens aperture, it is also possible to deal with photography even at darker places, and it is possible to widen conditions under which the photography is possible.

In the fast lens with a large aperture, photography with clarity is possible even with a small quantity of incident light. Accordingly, it is possible for a photographer to select a large number of capturing conditions such as increasing a shutter speed in continuous capturing of a moving object, to even higher speed. Therefore, in recent years, a fast lens with a large lens aperture has been drawing attention.

On the other hand, from a point of view of widening of a capture area, the demand for high magnification zoom is still there, and even higher magnification is anticipated.

As a small-size zoom lens with a comparatively higher zoom ratio and fast aperture, a zoom lens which includes in order from an object side, a first lens unit having one positive lens, a second lens unit having a negative refractive power, a third lens unit having a positive refractive power, and a fourth lens unit having a positive refractive power has been disclosed as a first embodiment (Example 1) in Japanese Patent Application Laid-open Publication No. 2009-276794.

SUMMARY OF THE INVENTION

A zoom lens according to the present invention comprises in order from an object side, a first lens unit having a positive refractive power, and at the time of zooming from a wide angle end to a telephoto end, the first lens unit moves, and the zoom lens satisfies the following conditional expression (1)

$$FNO(W) < 1.64 \tag{1}$$

where,

FNO(W) denotes an F-number of the zoom lens at the wide angle end.

Moreover, an image pickup apparatus comprises the abovementioned zoom lens, and an image pickup apparatus which is disposed at an object side of the zoom lens and which converts an optical image formed by the zoom lens to an electric signal.

BRIEF DESCRIPTION OF THE DRAWINGS

FIG. 1A is a cross-sectional view at a wide angle end, FIG. 1B is a cross-sectional view in an intermediate state, and FIG. 1C is a cross-sectional view at a telephoto end;

FIG. 2A is a cross-sectional view at a wide angle end, FIG. 2B is a cross-sectional view in an intermediate state, and FIG. 2C is a cross-sectional view at a telephoto end;

FIG. 3A is a cross-sectional view at a wide angle end, FIG. 3B is a cross-sectional view in an intermediate state, and FIG. 3C is a cross-sectional view at a telephoto end;

FIG. 4A is a cross-sectional view at a wide angle end, FIG. 4B is a cross-sectional view in an intermediate state, and FIG. 4C is a cross-sectional view at a telephoto end;

FIG. 5A is a cross-sectional view at a wide angle end, FIG. 5B is a cross-sectional view in an intermediate state, and FIG. 5C is a cross-sectional view at a telephoto end;

FIG. 6A is a cross-sectional view at a wide angle end, FIG. 6B is a cross-sectional view in an intermediate state, and FIG. 6C is a cross-sectional view at a telephoto end;

FIG. 7A is a cross-sectional view at a wide angle end, FIG. 7B is a cross-sectional view in an intermediate state, and FIG. 7C is a cross-sectional view at a telephoto end;

FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L are aberration diagrams of the zoom lens according to the first embodiment, and are aberration diagrams at the time of infinite object point focusing in three different states;

FIG. 9A, FIG. 9B, FIG. 9C, FIG. 9D, FIG. 9E, FIG. 9F, FIG. 9G, FIG. 9H, FIG. 9I, FIG. 9J, FIG. 9K, and FIG. 9L are aberration diagrams of the zoom lens according to the second embodiment, and are aberration diagrams at the time of infinite object point focusing in three different states;

FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L are aberration diagrams of the zoom lens according to the third embodiment, and are aberration diagrams at the time of infinite object point focusing in three different states;

FIG. 11A, FIG. 11B, FIG. 11C, FIG. 11D, FIG. 11E, FIG. 11F, FIG. 11G, FIG. 11H, FIG. 11I, FIG. 11J, FIG. 11K, and FIG. 11L are aberration diagrams of the zoom lens according to the fourth embodiment, and are aberration diagrams at the time of infinite object point focusing in three different states;

FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L are aberration diagrams of the zoom lens according to the fifth embodiment, and are aberration diagrams at the time of infinite object point focusing in three different states;

FIG. 14A, FIG. 14B, FIG. 14C, FIG. 14D, FIG. 14E, FIG. 14F, FIG. 14G, FIG. 14H, FIG. 14I, FIG. 14J, FIG. 14K, and FIG. 14L are aberration diagrams of the zoom lens according to the seventh embodiment, and are aberration diagrams at the time of infinite object point focusing in three different states;

DETAILED DESCRIPTION OF THE INVENTION

Figure 1A:
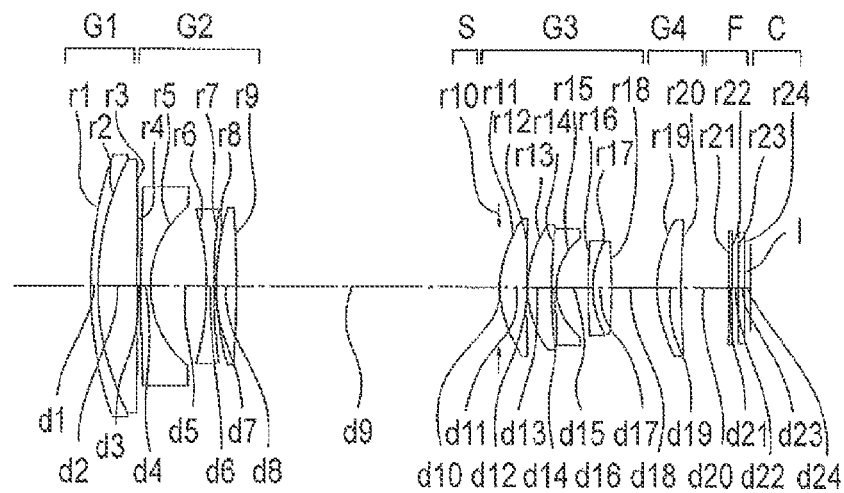
FIG. 1A, FIG. 1B, and FIG. 1C are lens cross-sectional views at the time of infinite object point focusing of a zoom lens according to a first embodiment of the present invention, where.

Exemplary embodiments of a zoom lens, and an image pickup apparatus using the same according to the present invention will be described below in detail while referring to the accompanying diagrams. However, the present invention is not restricted to the embodiments described below.

To start with, prior to the description of the embodiments, an action and effect of an image pickup optical system according to the present invention will be described below.

The embodiments and examples of the zoom lens and the image pickup apparatus according to the present invention will be described below in detail by referring to the accompanying diagrams. However, the present invention is not restricted to the embodiments and examples described below.

The zoom lens according to (a first aspect of) the present invention comprises in order from an object side a first lens unit having a positive refractive power, and at the time of zooming from a wide angle end to a telephoto end, the first lens unit moves, and the zoom lens satisfies the following conditional expression (1)

$$FNO(W) < 1.64 \quad (1)$$

where,

FNO(W) denotes an F-number of the zoom lens at the wide angle end.

For making an F-number of the zoom lens smaller, or in other words, for realizing a fast zoom lens, it is necessary to make large a diameter of an aperture stop and an effective diameter of a lens. Therefore, a diameter of the lens unit nearest to the object side also becomes large. When a refractive power of a lens having a large effective diameter is made strong, the number of lenses for aberration correction increases. Accordingly, the overall length of the lens system becomes long.

In the present invention, it is possible to provide a fast zoom lens with an F-number not more than 2, having a favorable optical performance, while suppressing an increase in the size of the zoom lens.

Moreover, according to a preferable aspect of the present invention, it is desirable that the zoom lens comprises in order from an object side a first lens unit having a positive refractive power, a second lens unit having a negative refractive power, and a third lens unit having a positive refractive power.

Accordingly, it is possible to provide a fast zoom lens of a positive-lead type.

Moreover, according to a preferable aspect of the present invention, it is desirable that the zoom lens satisfies the following conditional expression (2).

$$-0.8 < f2/ft < -0.32 \quad (2)$$

where, f2 denotes a focal length of the second lens unit, and ft denotes a focal length of the overall zoom lens system at the telephoto end.

Conditional expression (2) regulates an appropriate ratio of the focal length of the overall zoom lens system at the telephoto end and the focal length of the second lens unit.

When an upper limit of conditional expression (2) is surpassed, the refractive power of the second lens unit becomes small. Therefore, the overall length of the zoom lens becomes long. Consequently, small-sizing of the zoom lens becomes difficult.

When a lower limit of conditional expression (2) is surpassed, a chromatic aberration of magnification and a curvature of field at the wide angle end occur substantially.

Moreover, according to a preferable aspect of the present invention, it is desirable that the zoom lens satisfies the following conditional expression (3).

$$3 < ft/fw \quad (3)$$

where, ft denotes a focal length of the overall zoom lens system at the telephoto end, and fw denotes a focal length of the overall zoom lens system at the wide angle end.

Conditional expression (3) regulates a conditional for securing a high zooming ratio.

Moreover, according to a preferable aspect of the present invention, it is desirable that the zoom lens satisfies the following conditional expression (4).

$$\Delta 1G/ft < 0.75 \quad (4)$$

where, $\Delta 1G$ denotes an amount of movement of the first lens unit when zoomed from the wide angle end to the telephoto end, and ft denotes a focal length of the overall zoom lens system at the telephoto end.

Conditional expression (4) regulates a ratio of the focal length of the overall zoom lens system at the telephoto end and the amount of movement of the first lens unit at the time of zooming.

When an upper limit of conditional expression (4) is surpassed, a fluctuation in a longitudinal chromatic aberration and the chromatic aberration of magnification at the time of zooming from the wide angle end to the telephoto end becomes large.

Moreover, due to the overall length of the zoom lens becoming large, small-sizing becomes difficult.

Moreover, according to a preferable aspect of the present invention, it is desirable that the third lens unit includes not less than four lenses.

By letting the third lens unit to have not less than four lenses, it is possible to suppress efficiently an occurrence of various aberrations such as a spherical aberration, a coma aberration, and a chromatic aberration.

Moreover, according to an aspect of the present invention, it is desirable that the zoom lens satisfies the following conditional expression (5).

$$2 < \beta 3(T)/\beta 3(W) \quad (5)$$

where, $\beta 3(W)$ denotes a lateral magnification of the third lens unit at the wide angle end, and $\beta 3(T)$ denotes a lateral magnification of the third lens unit at the telephoto end.

Conditional expression (5) regulates an appropriate zooming ratio of the third lens unit.

When a lower limit of conditional expression (5) is surpassed, it is necessary that the zooming is carried out by a lens unit other than the third lens unit. Accordingly, an occurrence of various aberrations becomes substantial. Furthermore, an amount of movement of the other lens unit becomes large.

Moreover, according to a preferable aspect of the present invention, it is desirable that the third lens unit satisfies the following conditional expression (6).

$$D(T)/ft < 4 \quad (6)$$

where, $D(T)$ denotes a total length of the zoom lens at the telephoto end, and $ft$ denotes a focal length of the overall zoom lens system at the telephoto end.

Conditional expression (6) regulates an appropriate ratio of the focal length of the overall zoom lens system at the telephoto end and the overall length of the zoom lens at the telephoto end.

When an upper limit of conditional expression (6) is surpassed, it is not possible to secure a compact structure.

Moreover, according to a preferable aspect of the present invention, it is desirable that the zoom lens satisfies the following conditional expression (7).

$$FNO(T) < 3.5 \quad (7)$$

where, $FNO(T)$ denotes an F-number of the zoom lens at the telephoto end.

Conditional expression (7) regulates the F-number of the zoom lens at the telephoto end.

When an upper limit of conditional expression (7) is surpassed, it is not possible to secure brightness at the telephoto end.

Moreover, according to a preferable aspect of the present invention, it is desirable that the zoom lens satisfies the following conditional expression (8).

$$1 < f1/ft < 2.3 \quad (8)$$

where, $f1$ denotes a focal length of the first lens unit, and $ft$ denotes a focal length of the overall zoom lens system at the telephoto end.

Conditional expression (8) regulates an appropriate ratio of the focal length of the overall zoom lens system at the telephoto end and the focal length of the first lens unit.

As the zoom lens becomes fast, a pupil diameter becomes large. Therefore, an effective diameter of the first lens unit becomes large, and therefore, a refractive power of the first lens unit becomes small.

When a lower limit of conditional expression (8) is surpassed, the curvature of field and the chromatic aberration of magnification at the telephoto end occur substantially.

When an upper limit of conditional expression (8) is surpassed, the refractive power of the first lens unit becomes small. Therefore, the overall length of the zoom lens becomes long. Consequently, small-sizing of the zoom lens becomes difficult.

Moreover, according to a preferable aspect of the present invention, it is desirable that the zoom lens satisfies the following conditional expression (9).

$$0.3 < (\beta 2(T)/\beta 2(W))/(\beta 3(T)/\beta 3(W)) < 1.2 \quad (9)$$

where, $\beta 2(W)$ denotes a lateral magnification of the second lens unit at the wide angle end, $\beta 2(T)$ denotes a lateral magnification of the second lens unit at the telephoto end, $\beta 3(W)$ denotes a lateral magnification of the third lens unit at the wide angle end, and $\beta 3(T)$ denotes a lateral magnification of the third lens unit at the telephoto end.

Conditional expression (9) regulates an appropriate ratio of zoom ratio of the third lens unit and a zoom ratio of the second lens unit. In other words, '$\beta 2(T)/\beta 2(W)/\beta 3(T)/\beta 3(W)$ regulates a balance of (between) the second lens unit and the third lens unit including the refractive power and the amount of movement.

When the zoom lens is made fast, the pupil diameter becomes large. Therefore, a diameter of the second lens unit becomes large.

Accordingly, as an attempt is made to impart a refractive power to the second lens unit, the curvature of field occurs substantially. Therefore, it is not possible to impart a zooming ratio to the second lens unit.

When an upper limit of conditional expression (9) is surpassed, a load of zooming on the second lens unit becomes large. Therefore, aberrations such as the chromatic aberration of magnification and the curvature of field at the wide angle end occur substantially.

Moreover, for suppressing the aberration, it is necessary to increase the number of lenses. Therefore, small-sizing of the zoom lens becomes difficult.

When a lower limit of conditional expression (9) is surpassed, the load of zooming on the third lens unit becomes excessively large. Accordingly, aberrations such as the spherical aberration and the coma aberration occur substantially, and fluctuation of the longitudinal chromatic aberration becomes large.

Moreover, according to a preferable aspect of the present invention, it is desirable that the zoom lens satisfies the following conditional expression (10).

$$-1.2 < f2/f3 < -0.4 \quad (10)$$

where, $f2$ denotes a focal length of the second lens unit, and $f3$ denotes a focal length of the third lens unit.

Conditional expression (10) regulates an appropriate ratio of the focal length of the third lens unit and the focal length of the second lens unit.

When a lower limit of conditional expression (10) is surpassed, the refractive power of the second lens with respect to the refractive power of the third lens becomes large. Accordingly, the chromatic aberration of magnification and the curvature of field at the wide angle end state occur substantially.

When an upper limit of conditional expression (10) is surpassed, the refractive power of the third lens unit becomes excessively large. Accordingly, the spherical aberration and the coma aberration occur substantially.

Moreover, according to a preferable aspect of the present invention it is desirable that the zoom lens satisfies the following conditional expression (11).

$$0.36 < f3/ft < 0.8 \tag{11}$$

where, f3 denotes a focal length of the third lens unit, and ft denotes a focal length of the overall zoom lens system at the telephoto end.

Conditional expression (11) regulates an appropriate ratio of the focal length of the overall zoom lens system at the telephoto end and the focal length of third lens unit.

When an upper limit of conditional expression (11) is surpassed, the refractive power of the third lens unit becomes small. Therefore, the overall length of the zoom lens becomes long. Accordingly, small-sizing of the zoom lens becomes difficult.

When a lower limit of conditional expression (11) is surpassed, the refractive power of the third lens unit becomes strong. Accordingly, the spherical aberration and the coma aberration occur substantially.

Moreover, according to a preferable aspect of the present invention, it is desirable that the zoom lens includes in order from the object side, a first lens unit having a positive refractive power, a second lens unit having a negative refractive power, a third lens unit having a positive refractive power, and a lens unit having a positive refractive power which is nearest to an image side, and which differs from the third lens unit.

Such an arrangement is advantageous for making a compact structure while securing the zooming ratio.

Moreover, according to a preferable aspect of the present invention, it is desirable that the zoom lens satisfies the following conditional expression (12).

$$\Sigma d/ft < 2 \tag{12}$$

where, $\Sigma d$ denotes a total thickness of the zoom lens, and ft denotes a focal length of the overall zoom lens system at the telephoto end.

Conditional expression (12) regulates an appropriate ratio of the focal length of the zoom lens at the telephoto end and the total thickness of the zoom lens.

By an upper limit of conditional expression (12) not being surpassed, it is possible to secure a compact structure.

Moreover, according to a preferable aspect of the present invention, it is desirable that the third lens unit includes not less than three lens components.

Here, the lens component means a lens body having only two surfaces namely an object-side surface and an image-side surface which make a contact with air in an effective optical path.

As the zoom lens becomes fast, the pupil diameter becomes large. Therefore, it is necessary to improve further an aberration performance.

Therefore, by letting the third lens unit to be a three-component unit, it is possible to suppress a refractive power of a first component, and to suppress an amount of aberration such as the spherical aberration and the coma aberration which occur.

Moreover, by inserting a third component into the third lens unit, it is possible to impose aberration correction. Accordingly, it is possible to realize high aberration-completion performance.

Moreover, according to a preferable aspect of the present invention, it is desirable that the zoom lens satisfies the following conditional expression (13).

$$0 < f\_3G1/f\_3G3 < 0.8 \tag{13}$$

where, f_3G1 denotes a focal length of a first lens component in the third lens unit, and f_3G3 denotes a focal length of a third lens component in the third lens unit.

Conditional expression (13) regulates an appropriate refractive power balance of the third lens component with respect to the first lens component in the third lens unit.

When the zoom lens becomes fast, the pupil diameter becomes large. As refractive power is imparted excessively to the first lens component, the spherical aberration and the coma aberration occur substantially.

Here, by imposing refractive power on the third lens component, it is possible to make small the refractive power of the first lens component. Accordingly, it is possible to suppress the spherical aberration and the coma aberration.

Moreover, it is possible to correct the coma aberration of higher order which occurs in the first lens component, by the third lens component.

When a lower limit of conditional expression (13) is surpassed, the refractive power of the third lens component becomes small. Therefore, it is necessary to impose the refractive power excessively on the first lens component. Accordingly, the spherical aberration and the coma aberration occur substantially. Consequently, correction of the coma aberration of higher order becomes difficult.

When an upper limit of conditional expression (13) is surpassed, the refractive power of the third lens component becomes excessively large. Moreover, it is not possible to place a principal point of the third lens unit on the object side. Therefore, the compact structure of the zoom lens becomes difficult.

Moreover, according to a preferable aspect of the present invention, it is desirable that the zoom lens satisfies the following conditional expression (14).

$$-2 < f\_3G2/f\_3G3 < 0 \tag{14}$$

where, f_3G2 denotes a focal length of a second lens component in the third lens unit, and f_3G3 denotes a focal length of a third lens component in the third lens unit.

Conditional expression (14) regulates an appropriate refractive power balance of the third lens component with respect to the second lens component in the third lens unit.

When a lower limit of conditional expression (14) is surpassed, the refractive power of the second lens component becomes small. Accordingly, correction of the coma aberration of higher order becomes difficult.

When an upper limit of conditional expression (14) is surpassed, the refractive power of the second lens component becomes large. Accordingly, the refractive power of the overall third lens unit cannot be let to be strong.

For maintaining the refractive power of the third lens unit, it is necessary to increase the refractive power of the first lens component. Accordingly, the spherical aberration and the coma aberration occur substantially. Therefore, bending-up of light due to the second lens component becomes substantial. Accordingly, a diameter of the third lens component becomes large. Consequently, it is difficult to impart refractive power to the third lens unit as a whole. Therefore, it is disadvantageous for small-sizing.

Moreover, according to a preferable aspect of the present invention, it is desirable that the third lens unit comprises in order from the object side a first lens component which is a positive lens, a second lens component which is a cemented lens of a positive lens and a negative lens, and a third lens component which is a cemented lens of a negative lens and a positive lens.

Accordingly, it is possible to correct the spherical aberration, the coma aberration, and the chromatic aberration efficiently in the second lens component and the third lens component while securing the refractive power of the first lens component in the third lens unit.

Moreover, according to a preferable aspect of the present invention, it is desirable that the third lens unit includes not less than four lens components.

By increasing the number of lens components, it is possible to suppress further the refractive power of the first lens component, and to suppress an amount of aberration such as the spherical aberration and the coma aberration which occurs.

Moreover, according to a preferable aspect of the present invention, it is desirable that the zoom lens satisfies the following conditional expression (15)

$$-0.62 < f\_3G1/f\_3G2 \qquad (15)$$

where, $f\_3G1$ denotes a focal length of a first lens component in the third lens unit, and $f\_3G2$ denotes a focal length of a second lens component in the third lens unit.

Conditional expression (15) regulates an appropriate refractive power balance of the first lens component with respect to the second lens component.

When a lower limit of conditional expression (15) is surpassed, the refractive power of the first lens component becomes small. Therefore, it is not possible to position the principal points of the third lens unit on the object side. This is disadvantageous for small-sizing of the zoom lens.

Moreover, according to a preferable aspect of the present invention, it is desirable that the zoom lens satisfies the following conditional expression (16).

$$0.1 < f\_3G1/f\_3G4 < 0.7 \qquad (16)$$

where, $f\_3G1$ denotes a focal length of the first lens component in the third lens unit, and $f\_3G4$ denotes a focal length of the fourth lens component in the third lens unit.

Conditional expression (16) regulates a refractive power balance of the fourth lens component with respect to the first lens component.

When the zoom lens becomes fast, the pupil diameter becomes large. When the refractive power is imparted excessively to the first lens component, the spherical aberration and the coma aberration occur substantially.

Therefore, by imparting the refractive power to the fourth lens component, it is possible to make the refractive power of the first lens component small. Accordingly, it is possible to suppress the spherical aberration and the coma aberration.

Moreover, it is possible to correct the coma aberration of higher order which occurs in the first lens component, by the fourth lens component.

When a lower limit of conditional expression (16) is surpassed, the refractive power of the fourth lens component becomes small. Therefore, it becomes necessary to impart refractive power excessively to the first lens component. Accordingly, the spherical aberration and the coma aberration occur substantially. Consequently, correction of the coma aberration of higher order becomes difficult.

When an upper limit of conditional expression (16) is surpassed, the refractive power of the fourth lens component becomes excessively large. Consequently, it is not possible to position the principal point of the third lens unit on the object side. Therefore, it becomes difficult to structure the zoom lens compactly.

According to a preferable aspect of the present invention, it is desirable that the zoom lens satisfies the following conditional expression (17).

$$-4.0 < f\_3G3/f\_3G4 < 0 \qquad (17)$$

where, $f\_3G3$ denotes a focal length of a third lens component in the third lens unit, and $f\_3G4$ denotes a focal length of a fourth lens component in the third lens unit.

Conditional expression (17) regulates a power balance of the fourth lens component with respect to the third lens component.

When a lower limit of conditional expression (17) is surpassed, the refractive power of the third lens component becomes small. Therefore, correction of the coma aberration of higher order becomes difficult.

When an upper limit of conditional expression (17) is surpassed, the refractive power of the third lens component becomes large. Therefore, it is not possible to make the refractive power of the overall third lens unit large (strong). For maintaining the refractive power of the third lens unit, it is necessary to make the refractive power of the first lens component strong. Accordingly, the spherical aberration and the coma aberration occur substantially.

Moreover, the bending-up (upward bending) of light rays due to the third lens component becomes large, and a diameter of the third lens component becomes large. Accordingly, it is difficult to impart refractive power to the third lens unit as a whole. Therefore, it is disadvantageous for small-sizing of the zoom lens.

Moreover, according to a preferable aspect of the present invention, it is desirable that the third lens unit comprises in order from the object side a first lens component which is a positive lens, a second lens component which is a cemented lens of a positive lens and a negative lens, and a third lens component which is a cemented lens of a negative lens and a positive lens.

By imparting the positive refractive power to the second lens component, it is possible to suppress the refractive power of the first lens component from becoming excessively large. Accordingly, it is possible to suppress an occurrence of the spherical aberration and the coma aberration. Moreover, by letting the third lens component to be a cemented lens, it is possible to correct the chromatic aberration efficiently.

Moreover, according to a preferable aspect of the present invention, it is desirable that the third lens unit includes not less than five lens components.

It is possible to compensate the load of aberration correction of the fourth lens component by the fifth lens component. Therefore, it is possible to suppress the amount of respective aberration which occurs.

Moreover, according to a preferable aspect of the present invention, it is desirable that the zoom lens satisfies the following conditional expression (18).

$$|f\_3G1/f\_3G2|<0.4 \quad (18)$$

where, f_3G1 denotes a focal length of a first lens component in the third lens unit, and f_3G2 denotes a focal length of a second lens component in the third lens unit.

Conditional expression (18) regulates a power balance of the first lens component with respect to the second lens component in the third lens unit.

Conditional expression (18) regulates a condition by using an absolute value.

In a case in which, the second lens component has a positive refractive power, it is for bearing the refractive power of the first lens component.

In a case in which, the second lens component has a negative refractive power, it is for carrying out correction of aberration of higher order.

Moreover, according to a preferable aspect of the present invention, it is desirable that the third lens unit includes at least one set of cemented lens.

By the cemented lens, it is possible to correct the chromatic aberration which occurs in the third lens unit efficiently.

Moreover, according to a preferable aspect of the present invention, it is desirable that an object-side surface of the cemented lens has a shape which is convex toward the object side, and that the zoom lens satisfies the following conditional expressions (19) and (20)

$$-0.1<(nd\_ce-L)-(nd\_ce-R) \quad (19)$$

$$5<(vd\_ce-L)-(vd\_ce-R)<25 \quad (20)$$

where, nd_ce-L denotes a refractive index with respect to a d-line of an object-side lens of a cemented lens nearest to the object side, in the third lens unit, nd_ce-R denotes a refractive index with respect to the d-line of an image-side lens of the cemented lens nearest to the object side, in the third lens unit, vd_ce-L denotes Abbe's number for the object-side lens of the cemented lens nearest to the object side, in the third lens unit, and vd_ce-R denotes Abbe's number for the image-side lens of the cemented lens nearest to the object side, in the third lens unit.

By balancing the refractive index of the object-side lens and the refractive index of the image-side lens such that conditional expression (19) is satisfied, it is possible to make strong a positive refractive power of the object-side surface of the cemented lens. Therefore, it is possible position the principal point of the third lens unit on the object side. Accordingly, small-sizing of the zoom lens is possible.

Moreover, by balancing simultaneously Abbe's number for the object-side lens and Abbe's number for the image-side lens such that conditional expression (20) is satisfied, it is possible to correct the chromatic aberration efficiently.

Moreover, according to a preferable aspect of the present invention, it is desirable that the object-side lens of the cemented lens is a positive lens.

Accordingly, it is possible to carry out the correction of chromatic aberration by the cemented lens more efficiently.

Moreover, according to a preferable aspect of the present invention, it is desirable that a lens component nearest to an image side in the third lens unit is a cemented lens of a negative lens and a positive lens.

By the cemented lens, it is possible to correct efficiently the chromatic aberration which occurs in the third lens unit.

Moreover, according to a preferable aspect of the present invention, it is desirable that the zoom lens satisfies the following conditional expression (21).

$$20<|vdp-vdn| \quad (21)$$

where, vdp denotes Abbe's number for the positive lens in the cemented lens, and vdn denotes Abbe's number for the negative lens in the cemented lens.

When a lower limit of conditional expression (21) is surpassed, the chromatic aberration occurs substantially.

Moreover, an image pickup apparatus according to the present invention comprises the abovementioned zoom lens, and an image pickup element which is disposed on an image side of the zoom lens, and which coverts an optical image formed by the zoom lens to an electric signal.

Accordingly, it is possible to achieve an image pickup apparatus which includes a zoom lens which is fast, small-size, and having a favorable image forming performance.

Moreover, according to an aspect of the present invention, it is desirable that the zoom lens satisfies the following conditional expression (22).

$$-0.2<\Delta LG/ft<0.3 \quad (22)$$

where,

ΔLG denotes an amount of movement of a lens unit nearest to the image side when zoomed from the wide angle end to the telephoto end.

Conditional expression (22) regulates a condition which is favorable for making small an amount of movement of the first lens unit for small-sizing, and adjusting the position of an image by moving the last lens unit toward the object side.

When an upper limit of conditional expression (22) is surpassed, a decrease in magnification due to the last lens unit becomes large. Therefore, it becomes necessary to compensate the amount of decrease in magnification by another lens unit.

When a lower limit of conditional expression (22) is surpassed, it is necessary to make the amount of movement of the first lens unit large. Therefore, the overall length of the zoom lens becomes long, which is disadvantageous for small-sizing.

Moreover, for making the functions (action and effect) more assured, it is preferable to set an upper limit value and a lower limit value in each of the abovementioned conditional expressions as follows.

For conditional expression (1), it is preferable to let an upper limit value to be 1.5.

For conditional expression (2), it is preferable to let a lower limit value to −0.6, and −0.5 is more preferable. Moreover, for conditional expression (2) it is preferable to let an upper limit value to be −0.32, and −0.32 is more preferable.

For conditional expression (3), it is preferable to let a lower limit value to be 3.4. The lower limit value 3.7 is more preferable, and the lower limit value 4.1 is even more preferable.

For conditional expression (4), it is preferable to let an upper limit value to be 0.65. The upper limit value 0.6 is more preferable, and the upper limit value 0.3 is even more preferable.

For conditional expression (5), it is preferable to let a lower limit value to be 2.6.

For conditional expression (6), it is preferable to let an upper limit value to be 3.5. The upper limit value 3.1 is more preferable, and the upper limit value 2.7 is even more preferable.

For conditional expression (7), it is preferable to let an upper limit value to be 3, and the upper limit value 2.5 is more preferable.

For conditional expression (8), it is preferable to let an upper limit value to be 2.1.

For conditional expression (9), it is preferable to let a lower limit value to be 0.5, and an upper limit value to be 1.

For conditional expression (10), it is preferable to let a lower limit value to be −1, and the lower limit value −0.75 is more preferable. Moreover, for conditional expression (10), it is preferable to let an upper limit value to be −0.5, and the upper limit value −0.7 is more preferable.

For conditional expression (11), it is preferable to let a lower limit value to be 0.6, and an upper limit value to be 0.7.

For conditional expression (12), it is preferable to let an upper limit value to be 1.5, and the upper limit value 1.2 is more preferable.

For conditional expression (13), it is preferable to let a lower limit value to be 0.1, and the lower limit value 0.2 is more preferable. Moreover, for conditional expression (13), it is preferable to let an upper limit value to be 0.71, and the upper limit value 0.2 is more preferable.

For conditional expression (14), it is preferable to let a lower limit value to be −1.7, and the lower limit value −0.5 is more preferable. Moreover, for conditional expression (14), it is preferable to let an upper limit value to be −0.2, and the upper limit value −0.5 is more preferable.

For conditional expression (15), it is preferable to let a lower limit value to be −0.2.

For conditional expression (16), it is preferable to let a lower limit value to be 0.15, and the lower limit value 0.4 is more preferable. Moreover, for conditional expression (16), it is preferable to let an upper limit value to be 0.7, and the lower limit value 0.4 is more preferable.

For conditional expression (17), it is preferable to let a lower limit value to be −2, and the lower limit value −0.6 is more preferable. Moreover, for conditional expression (17), it is preferable to let an upper limit value to be 0, and the upper limit value −0.6 is more preferable.

For conditional expression (18), it is preferable to let an upper limit value to be 0.2.

For conditional expression (19), it is preferable to let a lower limit value to be 0.

For conditional expression (20), it is preferable to let a lower limit value to be 10, and the lower limit value 15 is more preferable. Moreover, for conditional expression (20), it is preferable to let an upper limit value to be 20.

For conditional expression (22), it is preferable to let a lower limit value to be −0.15, and the lower limit value 0.05 is more preferable. Moreover, for conditional expression (22), it is preferable to let an upper limit value to be 0.2, and the upper limit value 0.05 is more preferable.

The abovementioned zoom lens may satisfy the plurality of arrangements simultaneously. Making such an arrangement is preferable for achieving a favorable zoom lens and an image pickup apparatus. Moreover, a combination of preferable arrangements is arbitrary. For each of the conditional expressions, value may be restricted only to an upper limit value or a lower limit value in a restricted numerical range of the conditional expression.

Exemplary embodiments of a zoom lens and an image pickup apparatus according to the present invention will be described below in detail by referring to the accompanying diagrams. However, the present invention is not restricted to the embodiments described below.

Embodiments from a first embodiment to a seventh embodiment of the zoom lens according to the present invention will be described below. Lens cross-sectional views at a wide angle end, in an intermediate state, and at a telephoto end at the time of infinite object point focusing of zoom lenses according to the embodiments from the first embodiment to the seventh embodiment are shown in diagrams from FIG. 1A to FIG. 7C. In diagrams from FIG. 1A to FIG. 7C, a first lens unit is denoted by G1, a second lens unit is denoted by G2, an aperture stop is denoted by S, a third lens unit is denoted by G3, a fourth lens unit is denoted by G4, a fifth lens unit is denoted by G5, a filter is denoted by F (such as a dust removing filter), a flat parallel plate of the cover glass C of an electronic image pickup element (CCD, C-MOS sensor) is denoted by C, and an image plane is denoted by I. A multilayer film for restricting wavelength region may be applied to a surface of the cover glass C. Moreover, an arrangement may be made to impart an effect of a low-pass filter by applying a wavelength-region restricting coating which restricts infrared rays to the cover glass C.

An arrangement may be made such that the flat parallel plate does not have a function of the low-pass filter.

Moreover, all numerical data is data in a state when focused at an object at an infinite distance. For the numerical data, a unit of length is mm and a unit of angle is ° (degrees). Furthermore, zoom data are values at a wide angle end, in an intermediate focal length state, and at a telephoto end.

Figure 1B:
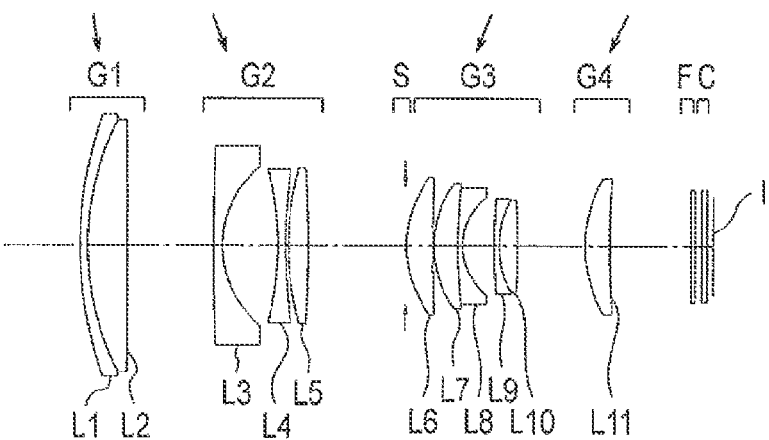
Figure 1C:
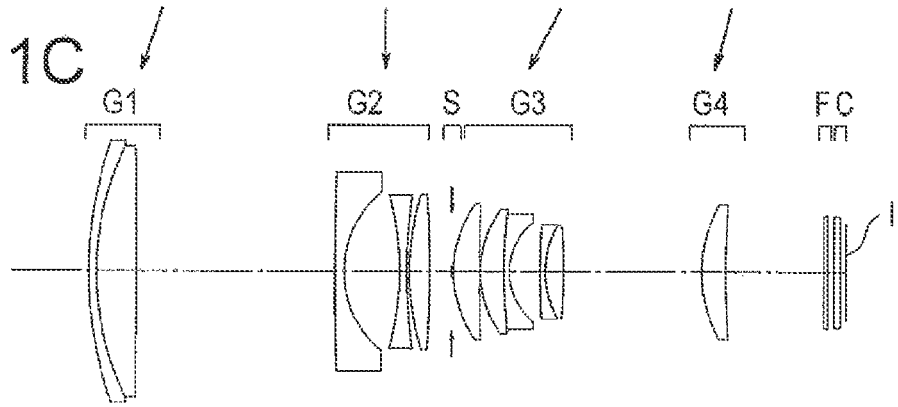

A zoom lens according to the first embodiment of the present invention, as shown in FIG. 1A, FIG. 1B, and FIG. 1C, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

At the time of zooming from the wide angle end to the telephoto end, the first lens unit G1 retracts after moving toward an image side, and then moves toward the object side. The second lens unit G2 retracts after moving toward the image side, and then moves toward the object side. The third lens unit G3 moves toward the object side. The fourth lens unit G4 moves toward the object side.

In order from the object side, the first lens unit G1 includes a negative meniscus lens L1 having a convex surface directed toward the object side and a biconvex positive lens L2. Here, the negative meniscus lens L1 and the biconvex lens L2 are cemented.

The second lens unit G2 includes a negative meniscus lens L3 having a convex surface directed toward the object side, a biconcave negative lens L4, and a biconvex positive lens L5.

The third lens unit G3 includes a positive meniscus lens L6 having a convex surface directed toward the object side, a positive meniscus lens L7 having a convex surface directed toward the object side, a negative meniscus lens L8 having a convex surface directed toward the object side, a negative meniscus lens L9 having a convex surface directed toward the object side, and a biconvex positive lens L10. Here, the positive meniscus lens L7 and the negative meniscus lens L8 are cemented. Moreover, the negative meniscus lens L9 and the biconvex positive lens L10 are cemented.

The fourth lens unit G4 includes a positive meniscus lens L11 having a convex surface directed toward the object side.

An aspheric surface is used for a total of four surfaces namely, both surfaces of the positive meniscus lens L6, an image-side surface of the biconvex positive lens L10, and an object-side surface of the positive meniscus lens L11.

Figure 2A:
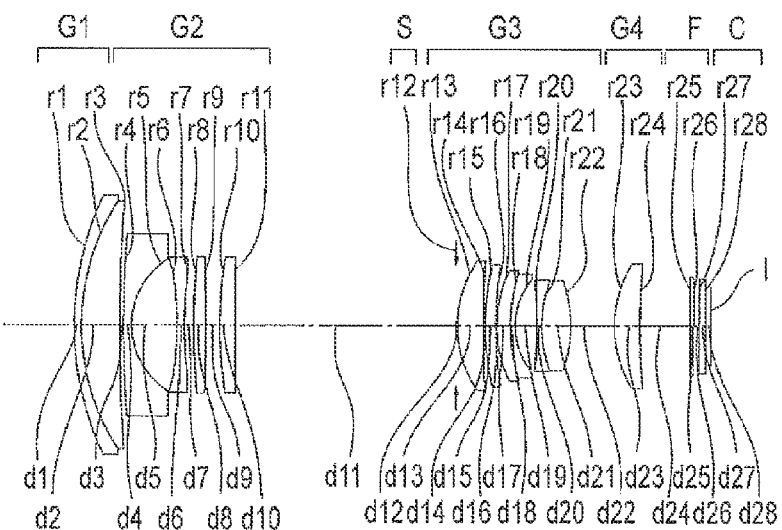
FIG. 2A, FIG. 2B, and FIG. 2C are lens cross-sectional views at the time of infinite object point focusing of a zoom lens according to a second embodiment of the present invention, where.
Figure 2B:
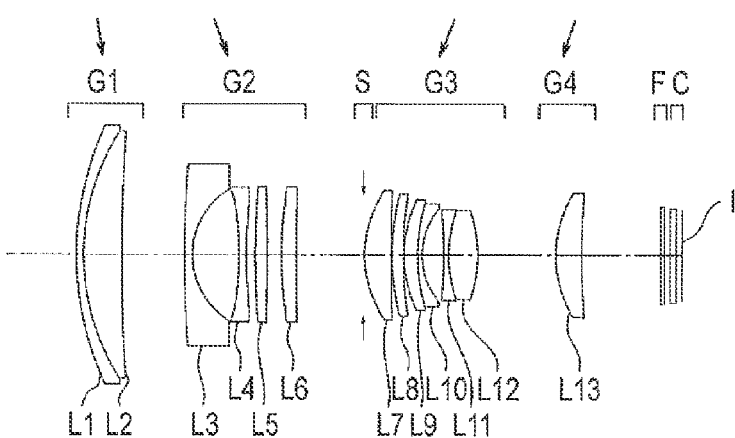
Figure 2C:
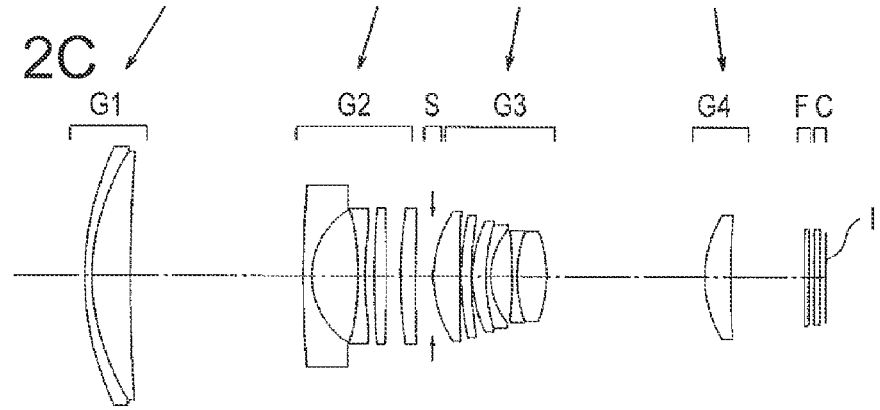

A zoom lens according to the second embodiment of the present invention, as shown in FIG. 2A, FIG. 2B, and FIG. 2C, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

At the time of zooming from the wide angle end to the telephoto end, the first lens unit G1 retracts after moving toward an image side, and then moves toward the object side. The second lens unit G2 retracts after moving the image side, and then moves toward the object side. The third lens unit G3 moves toward the object side. The fourth lens unit G4 retracts after moving toward the object side, and then moves toward the image side.

The first lens unit G1 includes a negative meniscus lens L1 having a convex surface directed toward the object side and a positive meniscus lens L2 having a convex surface directed toward the object side. Here, the negative meniscus lens L1 and the positive meniscus lens L2 are cemented.

The second lens unit G2 includes a negative meniscus lens L3 having a convex surface directed toward the object side, a biconcave negative lens L4, a biconvex positive lens L5, and a positive meniscus lens L6 having a convex surface directed toward the object side.

The third lens unit G3 includes a biconvex positive lens L7, a positive meniscus lens L8 having a convex surface directed toward the object side, a positive meniscus lens L9 having a convex surface directed toward the object side, a negative meniscus lens L10 having a convex surface directed toward the object side, a biconcave negative lens L11, and a biconvex positive lens L12. Here, the positive meniscus lens L9 and the negative meniscus lens L10 are cemented. Moreover, the biconcave negative lens L11 and the biconvex positive lens L12 are cemented.

The fourth lens unit G4 includes a positive meniscus lens L13 having a convex surface directed toward the object side.

An aspheric surface is used for a total of six surfaces namely, both surfaces of the biconcave negative lens L4, both surfaces of the biconvex positive lens L7, an image-side surface of the biconvex positive lens L12, and an object-side surface of the positive meniscus lens L13.

Figure 3A:
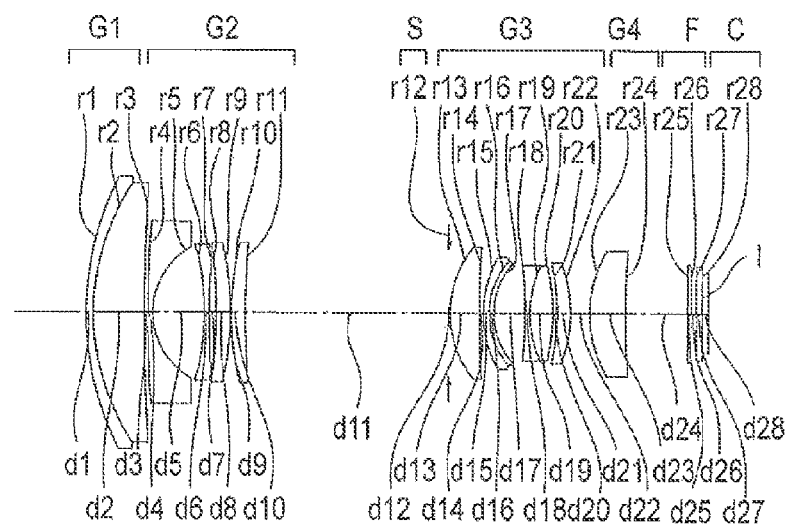
FIG. 3A, FIG. 3B, and FIG. 3C are lens cross-sectional views at the time of infinite object point focusing of a zoom lens according to a third embodiment of the present invention, where.
Figure 3B:
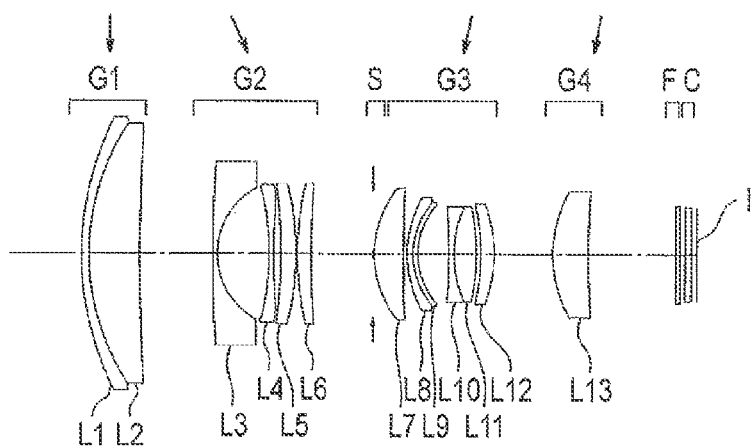
Figure 3C:
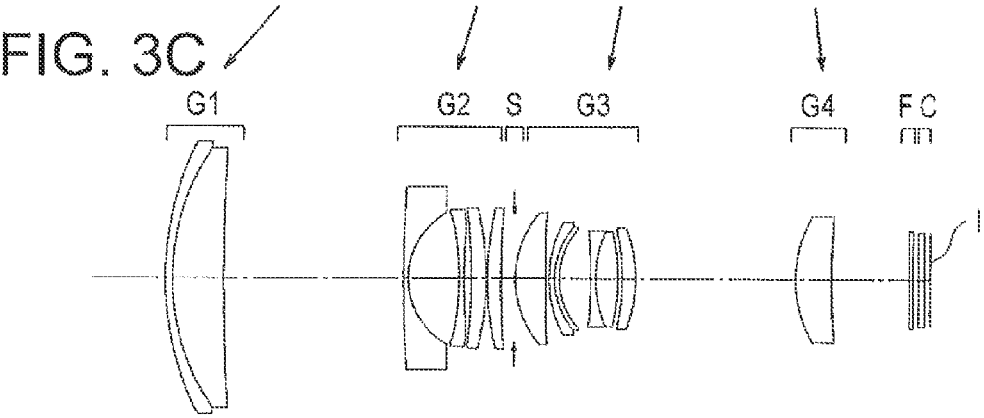

A zoom lens according to the third embodiment of the present invention, as shown in FIG. 3A, FIG. 3B, and FIG. 3C, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

At the time of zooming from the wide angle end to the telephoto end, the first lens unit G1 moves toward the object side. The second lens unit G2 retracts after moving toward an image side, and then moves toward the object side. The third lens unit G3 moves toward the object side. The fourth lens unit G4 retracts after moving toward the object side, and then moves toward the image side.

The first lens unit G1 includes a negative meniscus lens L1 having a convex surface directed toward the object side and a positive meniscus lens L2 having a convex surface directed toward the object side. Here, the negative meniscus lens L1 and the positive meniscus lens L2 are cemented.

The second lens unit G2 includes a negative meniscus lens L3 having a convex surface directed toward the object side, a biconcave negative lens L4, a positive meniscus lens L5 having a convex surface directed toward the image side, and a positive meniscus lens L6 having a convex surface directed toward the object side.

The third lens unit G3 includes a biconvex positive lens L7, a positive meniscus lens L8 having a convex surface directed toward the object side, a negative meniscus lens L9 having a convex surface directed toward the object side, a biconcave negative lens L10, a biconvex positive lens L11, and a positive meniscus lens L12 having a convex surface directed toward the image side. Here, the positive meniscus lens L8 and the negative meniscus lens L9 are cemented. Moreover, the biconcave negative lens L10 and the biconvex positive lens L11 are cemented.

The fourth lens unit G4 includes a positive meniscus lens L13 having a convex surface directed toward the object side.

An aspheric surface is provided to a total of six surfaces namely, both surfaces of the biconcave negative lens L4, both surfaces of the biconvex positive lens L7, an image-side surface of the positive meniscus lens L12, and an object-side surface of the positive meniscus lens L13.

Figure 4A:
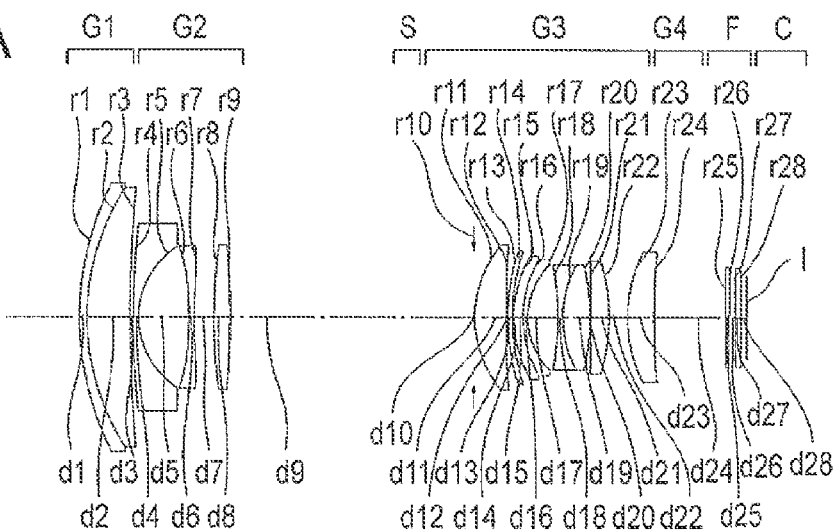
FIG. 4A, FIG. 4B, and FIG. 4C are lens cross-sectional views at the time of infinite object point focusing of a zoom lens according to a fourth embodiment of the present invention, where.
Figure 4B:
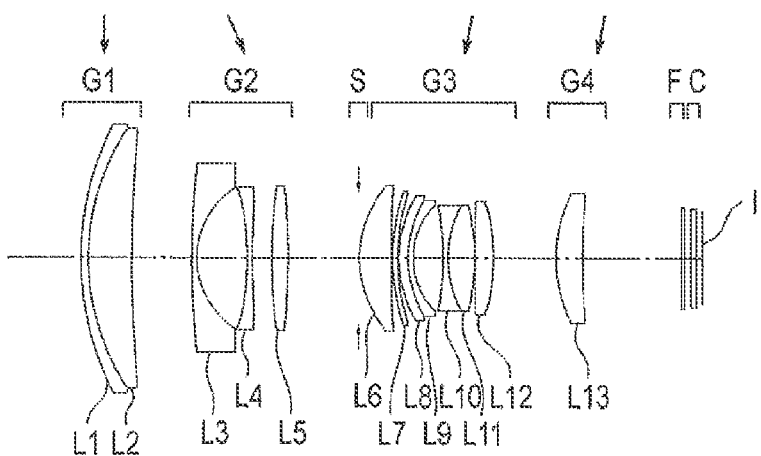
Figure 4C:
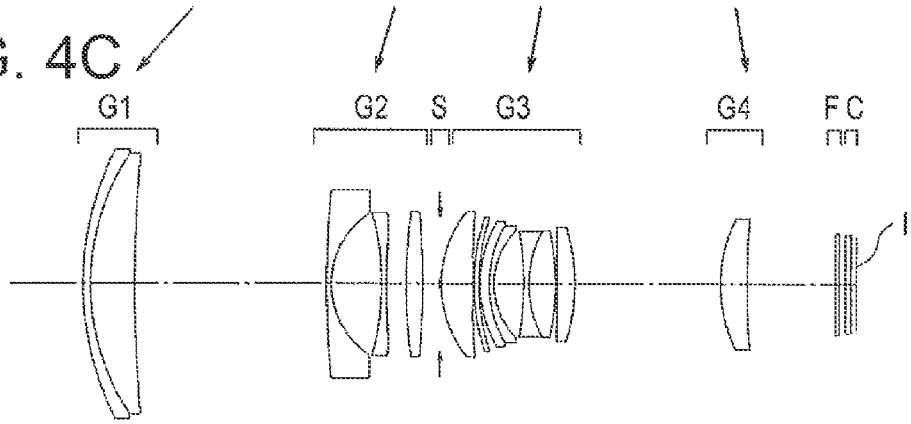

A zoom lens according to the fourth embodiment of the present invention, as shown in FIG. 4A, FIG. 4B, and FIG. 4C, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

At the time of zooming from the wide angle end to the telephoto end, the first lens unit G1 moves toward the object side. The second lens unit G2 retracts after moving toward an image side, and then moves toward the object side. The third lens unit G3 moves toward the object side. The fourth lens unit G4 retracts after moving toward the object side, and then moves toward the image side.

The first lens unit G1 includes a negative meniscus lens L1 having a convex surface directed toward the object side and a positive meniscus lens L2 having a convex surface directed toward the object side. Here, the negative meniscus lens L1 and the positive meniscus lens L2 are cemented.

The second lens unit G2 includes a negative meniscus lens L3 having a convex surface directed toward the object side, a biconcave negative lens L4, and a biconvex positive lens L5.

The third lens unit G3 includes a positive meniscus lens L6 having a convex surface directed toward the object side, a negative meniscus lens L7 having a convex surface directed toward the object side, a negative meniscus lens L8 having a convex surface directed toward the object side, a negative meniscus lens L9 having a convex surface directed toward the object side, a biconcave negative lens L10, a biconvex positive lens L11, and a positive meniscus lens L12 having a convex surface directed toward the image side. Here, the negative meniscus lens L8 and the negative meniscus lens L9 are cemented. Moreover, the biconcave negative lens L10 and the biconvex positive lens L11 are cemented.

The fourth lens unit G4 includes a positive meniscus lens L13 having a convex surface directed toward the object side.

An aspheric surface is provided to a total of six surfaces namely, both surfaces of the biconcave negative lens L4, both surfaces of the positive meniscus lens L6, an image-side surface of the positive meniscus lens L12, and an object-side surface of the positive meniscus lens L13.

Figure 5A:
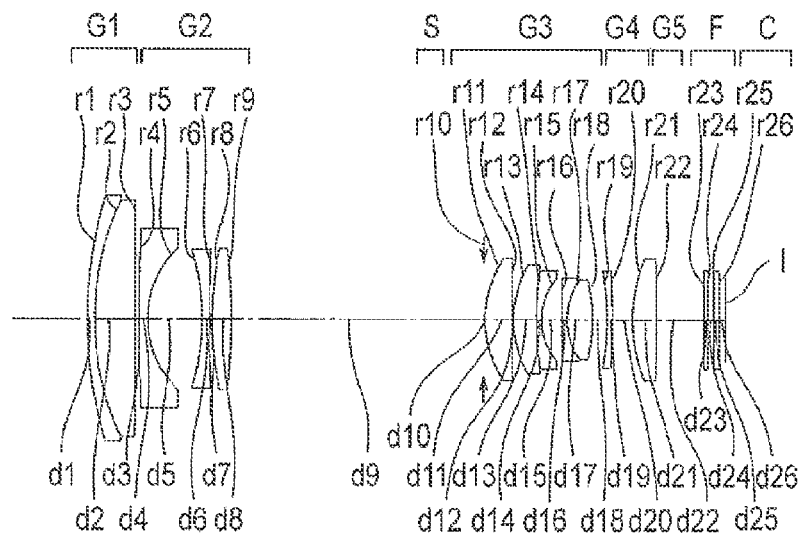
FIG. 5A, FIG. 5B, and FIG. 5C are lens cross-sectional views at the time of infinite object point focusing of a zoom lens according to a fifth embodiment of the present invention, where.
Figure 5B:
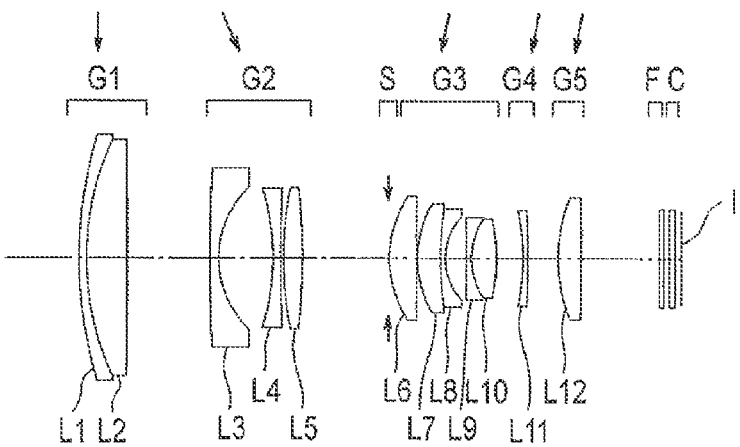
Figure 5C:
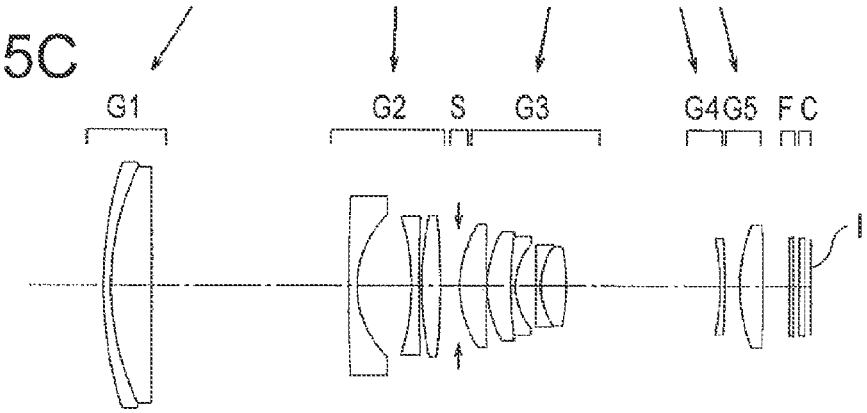

A zoom lens according to the fifth embodiment of the present invention, as shown in FIG. 5A, FIG. 5B, and FIG. 5C, includes in order from an object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

At the time of zooming form the wide angle end to the telephoto end, the first lens unit G1 moves toward the object side. The second lens unit G2 moves toward an image side. The third lens unit G3 moves toward the object side. The fourth lens unit G4 retracts after moving toward the object side, and then moves toward the image side. The fifth lens unit G5 retracts after moving toward the object side, and then moves toward the image side.

The first lens unit G1 includes a negative meniscus lens L1 having a convex surface directed toward the object side and a biconvex positive lens L2. Here, the negative meniscus lens L1 and the biconvex positive lens L2 are cemented.

The second lens unit G2 includes a negative meniscus lens L3 having a convex surface directed toward the object side, a biconcave negative lens L4, and a biconvex positive lens L5.

The third lens unit G3 includes a biconvex positive lens L6, a positive meniscus lens L7 having a convex surface directed toward the object side, a negative meniscus lens L8 having a convex surface directed toward the object side, a biconcave negative lens L9, and a biconvex positive lens L10. Here, the positive meniscus lens L7 and the negative meniscus lens L8 are cemented. Moreover, the biconcave negative lens L9 and the biconvex positive lens L10 are cemented.

The fourth lens unit G4 includes a negative meniscus lens L11 having a convex surface directed toward the object side.

The fifth lens unit G5 includes a biconvex positive lens L12.

An aspheric surface is provided to a total of four surfaces namely, both surfaces of the biconvex positive lens L6, an image-side surface of the biconvex positive lens L10, and an object-side surface of the biconvex positive lens L12.

Figure 6A:
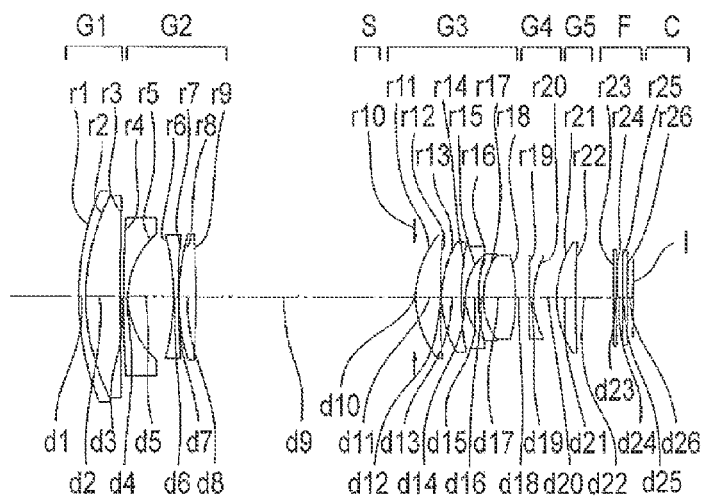
FIG. 6A, FIG. 6B, and FIG. 6C are lens cross-sectional views at the time of infinite object point focusing of a zoom lens according to a sixth embodiment of the present invention, where.
Figure 6B:
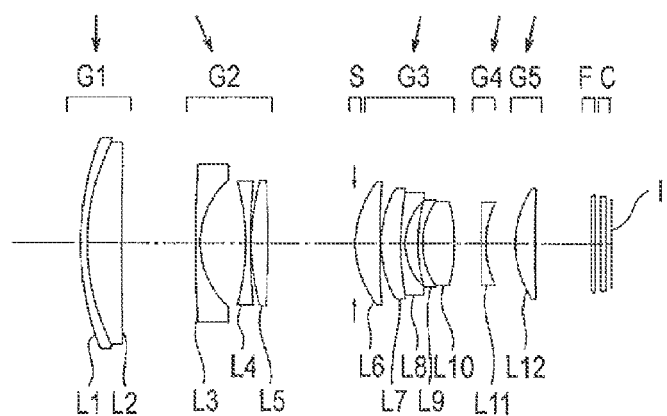
Figure 6C:
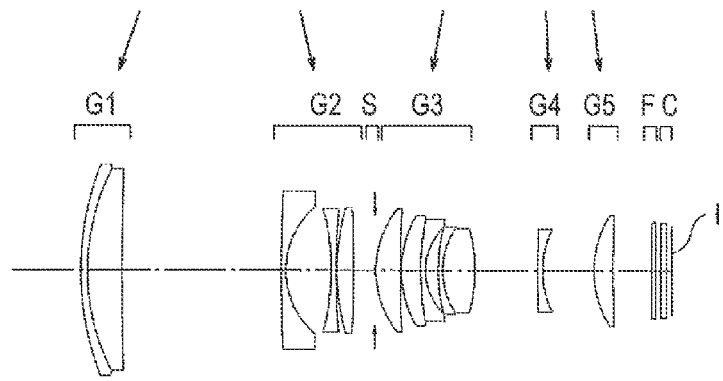

A zoom lens according to the sixth embodiment of the present invention, as shown in FIG. 6A, FIG. 6B, and FIG. 6C, includes in order from an object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

At the time of zooming from the wide angle end to the telephoto end, the first lens unit G1 moves toward the object side. The second lens unit G2 moves toward an image side. The third lens unit G3 moves toward the object side. The fourth lens unit G4 retracts after moving toward the object side, and then moves toward the image side. The fifth lens unit G5 retracts after moving toward the object side, and then moves toward the image side.

The first lens unit G1 includes a negative meniscus lens L1 having a convex surface directed toward the object side and a positive meniscus lens L2 having a convex surface directed toward the object side. Here, the negative meniscus lens L1 and the positive meniscus lens L2 are cemented.

The second lens unit G2 includes a negative meniscus lens L3 having a convex surface directed toward the object side, a biconcave negative lens L4, and a biconvex positive lens L5.

The third lens unit G3 includes a positive meniscus lens L6 having a convex surface directed toward the object side, a positive meniscus lens L7 having a convex surface directed toward the object side, a negative meniscus lens L8 having a convex surface directed toward the object side, a negative meniscus lens L9 having a convex surface directed toward the object side, and a biconvex positive lens L10. Here, the positive meniscus lens L7 and the negative meniscus lens L8 are cemented. Moreover, the negative meniscus lens L9 and the biconvex positive lens L10 are cemented.

The fourth lens unit G4 includes a negative meniscus lens L11 having a convex surface directed toward the object side.

The fifth lens unit G5 includes a positive meniscus lens L12 having a convex surface directed toward the object side.

An aspheric surface is provided to a total of five surfaces namely, both surfaces of the positive meniscus lens L6, an image-side surface of the biconvex positive lens L10, an image side surface of the negative meniscus lens L11, and an object-side surface of the positive meniscus lens L12.

Figure 7A:
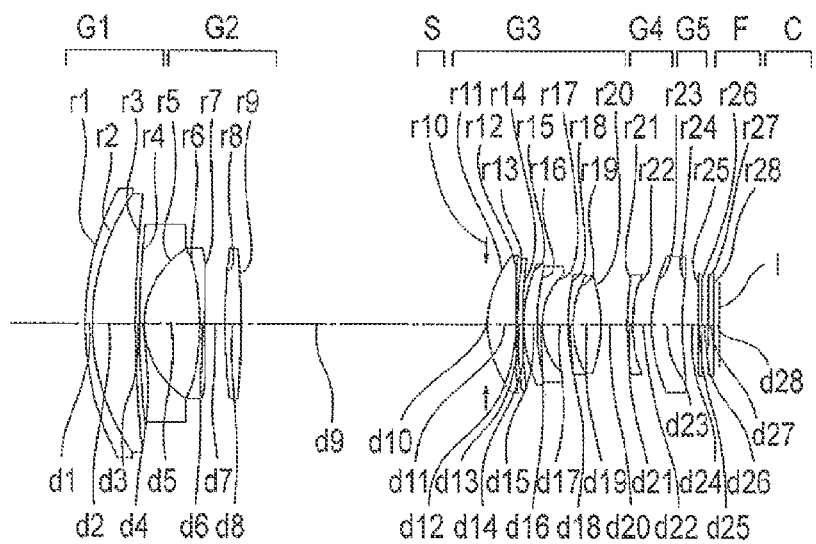
FIG. 7A, FIG. 7B, and FIG. 7C are lens cross-sectional views at the time of infinite object point focusing of a zoom lens according to a seventh embodiment of the present invention, where.
Figure 7B:
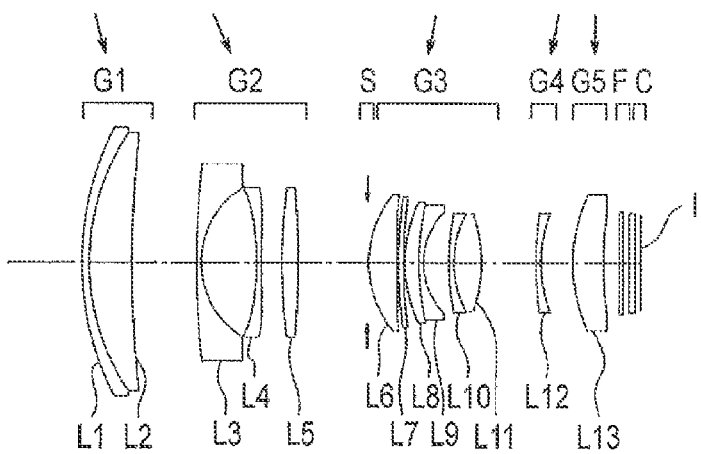
Figure 7C:
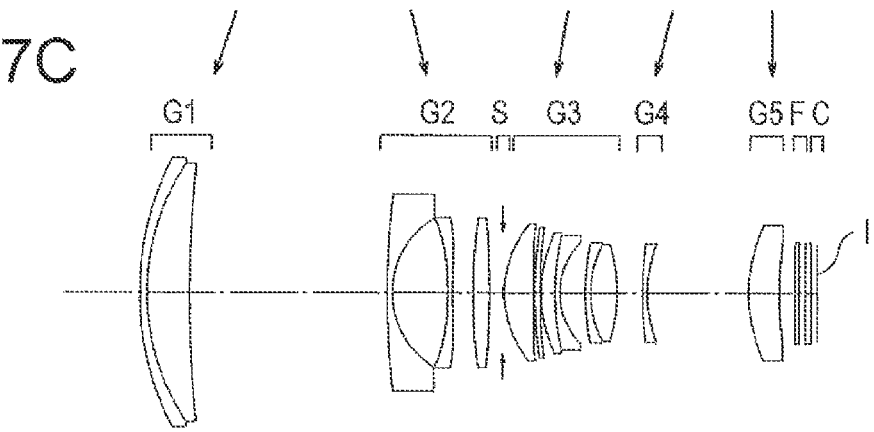
Figures 13A, 13B, 13C, 13D:
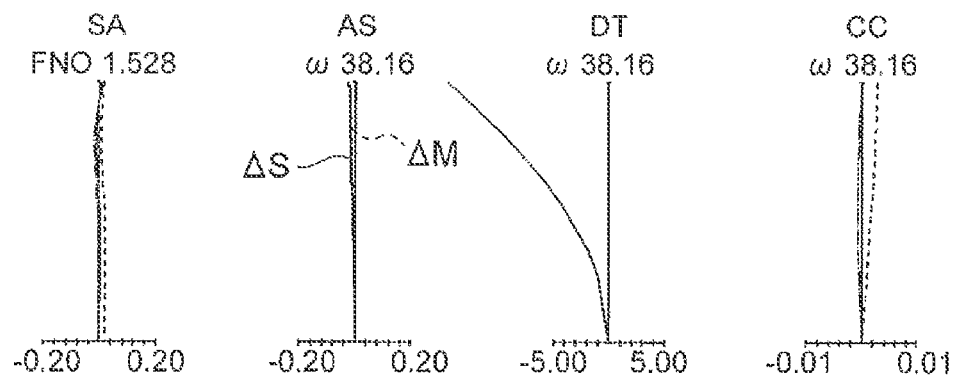
FIG. 13A, FIG. 13B, FIG. 13C, FIG. 13D, FIG. 13E, FIG. 13F, FIG. 13G, FIG. 13H, FIG. 13I, FIG. 13J, FIG. 13K, and FIG. 13L are aberration diagrams of the zoom lens according to the sixth embodiment, and are aberration diagrams at the time of infinite object point focusing in three different states.
Figures 13E, 13F, 13G, 13H:
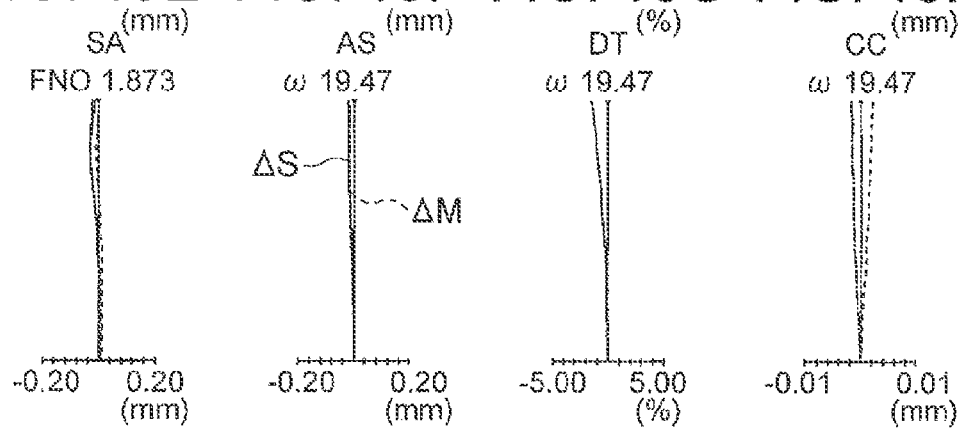
Figures 13I, 13J, 13K, 13L:
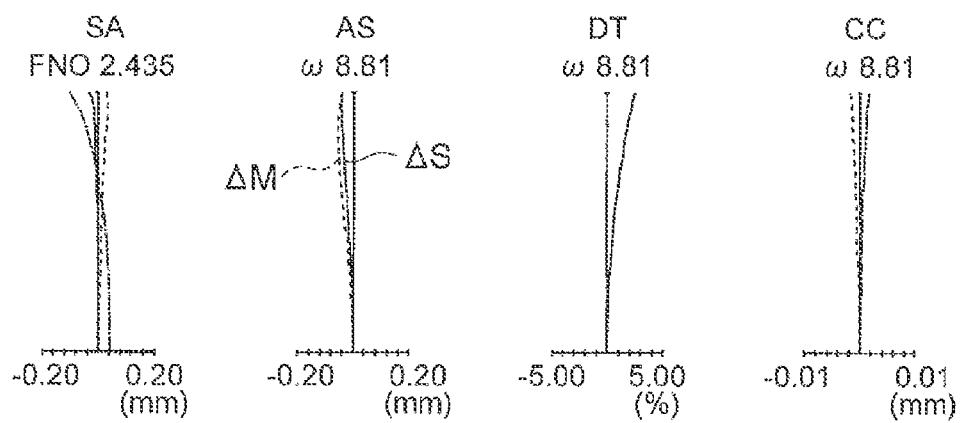

A zoom lens according to the seventh embodiment of the present invention, as shown in FIG. 7A, FIG. 7B, and FIG. 7C, includes in order from an object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

At the time of zooming from the wide angle end to the telephoto end, the first lens unit G1 retracts after moving toward an image side, and then moves toward the object side. The second lens unit G2 moves toward the image side. The third lens unit G3 moves toward the object side. The fourth lens unit G4 moves toward the object side. The fifth lens unit G5 is fixed.

The first lens unit G1 includes a negative meniscus lens L1 having a convex surface directed toward the object side and a positive meniscus lens L2 having a convex surface directed toward the object side. Here, the negative meniscus lens L1 and the positive meniscus lens L2 are cemented.

The second lens unit G2 includes a negative meniscus lens having a convex surface directed toward the object side, a biconcave negative lens L4, and a biconvex positive lens L5.

The third lens unit G3 includes a biconvex positive lens L6, a positive meniscus lens L7 having a convex surface directed toward the object side, a positive meniscus lens L8 having a convex surface directed toward the object side, a negative meniscus lens L9 having a convex surface directed toward the object side, a negative meniscus lens L10 having a convex surface directed toward the object side, and a biconvex positive lens L11. Here, the positive meniscus lens L8 and the negative meniscus lens L9 are cemented. Moreover, the negative meniscus lens L10 and the biconvex positive lens L11 are cemented.

The fourth lens unit G4 includes a negative meniscus lens L12 having a convex surface directed toward the object side.

The fifth lens unit G5 includes a positive meniscus lens L13 having a convex surface directed toward the object side.

An aspheric surface is provided to a total of seven surfaces namely, both surfaces of the biconcave negative lens L4, both surfaces of the biconvex positive lens L6, an image-side surface of the biconvex positive lens L11, and both surfaces of the negative meniscus lens L12.

The numerical data of each of the abovementioned embodiments is shown below. Apart from the symbols described above, r denotes a radius of curvature of each lens surface, d denotes a distance between two lens surfaces, nd denotes a refractive index for d-line of each lens, and vd denotes Abbe's number for each lens. Moreover, the focal length is the focal length of the overall system, FNO denotes an F-number, ω denotes a half angle of field, and f1, f2, . . . denote focal length or respective lens units. The overall length is a length obtained by adding back focus to a distance from a lens front-surface up to a lens rear-surface. fb (back focus) is expressed upon letting a distance from the lens front-surface up to a paraxial image plane undergo air conversion.

Moreover, regarding a focused state, 'at infinity (or infinite distance)' indicates a state when focused at an object at infinite distance, 'magnified –1/10 times' indicates a state when focused at an object for which the magnification becomes –1/10 times, and when a distance between an object and an image is 200 mm, it indicates a state when focused at an object for which the distance between the object and an image becomes 200 mm. As a state of focused at an object at a short distance, a state in which the distance between the object and an image is 200 mm is available.

In the numerical values of the embodiments, a surface marked "*" has an aspheric surface.

When x is let to be an optical axis with a direction of traveling of light as a positive (direction), and y is let to be in a direction orthogonal to the optical axis, a shape of the aspheric surface is described by the following expression.

$$x=(y^2/R)/[1+\{1-(K+1)(y/R)^2\}^{1/2}]+A_4 y^4+A_6 y^6+A_8 y^8+A_{10} y^{10}+A_{12} y^{12}$$

where, R denotes a paraxial radius of curvature, K denotes a conical coefficient, A4, A6, A8, A10, and A12 denote aspherical surface coefficients of a fourth order, a sixth order, an eight order, a tenth order, and a twelfth order respectively. Moreover, in the aspherical surface coefficients, 'e–n' (where, n is an integral number) indicates '$10^{-n}$'.

Example 1

Unit mm

Surface data

| Surface no. | r | d | nd | vd |
|---|---|---|---|---|
| Object plane | ∞ | ∞ | | |
| 1 | 31.836 | 0.60 | 1.84666 | 23.78 |
| 2 | 23.000 | 3.08 | 1.72916 | 54.68 |
| 3 | −1424.613 | Variable | | |
| 4 | 238.786 | 0.70 | 1.88300 | 40.76 |
| 5 | 8.234 | 4.40 | | |
| 6 | −23.701 | 0.60 | 1.88300 | 40.76 |
| 7 | 47.895 | 0.20 | | |
| 8 | 22.405 | 1.60 | 1.92286 | 18.90 |
| 9 | −100.083 | Variable | | |
| 10 (stop) | ∞ | 0.10 | | |
| 11* | 8.871 | 2.05 | 1.80610 | 40.92 |
| 12* | 228.015 | 0.10 | | |
| 13 | 8.636 | 1.86 | 1.88300 | 40.76 |
| 14 | 42.922 | 0.40 | 1.80810 | 22.76 |
| 15 | 5.039 | 2.46 | | |
| 16 | 57.150 | 0.40 | 1.63980 | 34.46 |
| 17 | 7.978 | 1.44 | 1.58313 | 59.38 |
| 18* | −55.171 | Variable | | |
| 19* | 10.506 | 1.90 | 1.52542 | 55.78 |
| 20 | 70.000 | Variable | | |
| 21 | ∞ | 0.30 | 1.51633 | 64.14 |
| 22 | ∞ | 0.50 | | |
| 23 | ∞ | 0.50 | 1.51633 | 64.14 |
| 24 | ∞ | 0.50 | | |
| Image plane(Image pickup surface) ∞ | | | | |

Aspherical surface data

11th surface

K = 0.000
A4 = −1.35303e−04, A6 = −1.43789e−07, A8 = −3.79066e−08

12th surface

K = 0.000
A4 = −3.10204e−05, A6 = 3.91440e−07, A8 = −2.02694e−08

18th surface

K = 0.000
A4 = −5.59643e−05, A6 = 4.25186e−06, A8+32-3.53224e−07

19th surface

K = 0.000
A4 = −1.03426e−04, A6 = 5.29674e−07, A8+32-7.71621e−09

Zoom data

| | Wide angle | Intermediate | Telephoto |
|---|---|---|---|
| Focal length | 5.06 | 11.08 | 24.29 |
| Fno. | 1.63 | 2.07 | 2.71 |
| Angle of field 2ω | 76.36 | 38.83 | 17.79 |
| fb (in air) | 5.31 | 8.01 | 9.30 |
| Lens total length (in air) | 51.77 | 49.65 | 59.43 |
| d3 | 0.30 | 6.80 | 15.67 |
| d9 | 20.72 | 7.67 | 1.77 |
| d18 | 3.57 | 5.29 | 10.81 |
| d20 | 3.78 | 6.48 | 7.77 |

Unit focal length

| f1 = 45.42 | f2 = −9.38 | f3 = 13.17 | f4 = 23.27 |

Example 2

Unit mm

Surface data

| Surface no. | r | d | nd | vd |
|---|---|---|---|---|
| Object plane | ∞ | ∞ | | |
| 1 | 26.664 | 0.60 | 1.94595 | 17.98 |
| 2 | 20.000 | 3.27 | 1.81600 | 46.62 |
| 3 | 166.018 | Variable | | |
| 4 | 104.073 | 0.70 | 1.88300 | 40.76 |
| 5 | 6.802 | 3.94 | | |
| 6* | −37.769 | 0.60 | 1.74320 | 49.34 |
| 7* | 23.196 | 0.81 | | |
| 8 | 74.098 | 1.02 | 1.94595 | 17.98 |
| 9 | −167.781 | 1.22 | | |
| 10 | 38.320 | 1.28 | 1.94595 | 17.98 |
| 11 | 354.031 | Variable | | |
| 12 (stop) | ∞ | 0.10 | | |
| 13* | 9.894 | 2.26 | 1.85135 | 40.10 |
| 14* | −705.214 | 0.10 | | |
| 15 | 23.438 | 0.89 | 1.61800 | 63.33 |
| 16 | 32.101 | 0.10 | | |
| 17 | 10.979 | 1.16 | 1.88300 | 40.76 |
| 18 | 15.689 | 0.40 | 1.80810 | 22.76 |
| 19 | 6.338 | 1.84 | | |
| 20 | −41.392 | 0.40 | 1.80518 | 25.42 |
| 21 | 11.662 | 2.50 | 1.58313 | 59.38 |
| 22* | −11.523 | Variable | | |
| 23* | 10.213 | 2.20 | 1.49700 | 81.54 |
| 24 | 70.000 | Variable | | |
| 25 | ∞ | 0.30 | 1.51633 | 64.14 |
| 26 | ∞ | 0.50 | | |
| 27 | ∞ | 0.50 | 1.51633 | 64.14 |
| 28 | ∞ | 0.50 | | |
| Image plane (Image pickup surface) | ∞ | | | |

-continued

Unit mm

Aspherical surface data

6th surface

K = 0.000   A6 = 7.56807e−06   A8 = −1.18154e−07
A4 = −3.45273e−04
A10 = −1.21720e−09

7th surface

K = 0.000   A6 = 1.04589e−05   A8 = −2.72958e−07
A4 = −5.08841e−04
A10 = 1.45489e−09

13th surface

K = 0.000   A6 = 1.18618e−06   A8 = −2.26295e−08
A4 = −8.70870e−05

14th surface

K = 0.000   A6 = 1.58967e−06   A8 = −3.03237e−08
A4 = 1.05332e−04

22nd surface

K = 0.000   A6 = −8.74916e−07   A8 = 5.11227e−08
A4 = 1.40156e−05

23rd surface

K = 0.000   A6 = −3.29639e−07   A8 = 1.94664e−09
A4 = −3.98099e−05

Zoom data

| | Wide angle | Intermediate | Telephoto |
|---|---|---|---|
| Focal length | 4.40 | 9.64 | 21.12 |
| Fno. | 1.45 | 1.92 | 2.42 |
| Angle of field 2ω | 84.35 | 44.80 | 20.46 |
| fb (in air) | 5.85 | 8.36 | 7.93 |
| Lens total length (in air) | 54.14 | 51.49 | 63.00 |
| d3 | 0.30 | 5.38 | 14.74 |
| d11 | 18.90 | 5.74 | 1.45 |
| d22 | 3.70 | 6.62 | 13.49 |
| d24 | 4.32 | 6.83 | 6.40 |

Unit focal length

| f1 = 40.91 | f2 = −8.08 | f3 = 13.86 | f4 = 23.77 |

Example 3

Unit mm

Surface data

| Surface no. | r | d | nd | νd |
|---|---|---|---|---|
| Object plane | ∞ | ∞ | | |
| 1 | 25.919 | 0.60 | 1.94595 | 17.98 |
| 2 | 20.000 | 4.24 | 1.77250 | 49.60 |
| 3 | 179.565 | Variable | | |
| 4 | 105.653 | 0.40 | 1.88300 | 40.76 |
| 5 | 6.403 | 4.32 | | |
| 6* | −23.750 | 0.40 | 1.74320 | 49.34 |
| 7* | 43.631 | 0.60 | | |
| 8 | −48.825 | 1.24 | 1.94595 | 17.98 |
| 9 | −25.872 | 0.10 | | |
| 10 | 26.140 | 1.15 | 1.94595 | 17.98 |
| 11 | 75.727 | Variable | | |
| 12 (stop) | ∞ | 0.10 | | |
| 13* | 8.636 | 2.47 | 1.85135 | 40.10 |
| 14* | −317.607 | 0.30 | | |
| 15 | 9.833 | 0.48 | 2.00069 | 25.46 |
| 16 | 6.760 | 0.40 | 1.92286 | 18.90 |
| 17 | 6.356 | 2.63 | | |

-continued

Unit mm

| 18 | −42.216 | 0.40 | 1.80810 | 22.76 |
|---|---|---|---|---|
| 19 | 10.044 | 1.86 | 1.59201 | 67.02 |
| 20 | −18.460 | 0.37 | | |
| 21 | −18.830 | 1.12 | 1.80610 | 40.92 |
| 22* | −11.933 | Variable | | |
| 23* | 10.575 | 2.97 | 1.49700 | 81.54 |
| 24 | 70.000 | Variable | | |
| 25 | ∞ | 0.30 | 1.51633 | 64.14 |
| 26 | ∞ | 0.50 | | |
| 27 | ∞ | 0.50 | 1.51633 | 64.14 |
| 28 | ∞ | 0.50 | | |
| Image plane (Image pickup surface) | ∞ | | | |

Aspherical surface data

6th surface

K = 0.000   A6 = −1.16157e−05   A8 = 4.01539e−07
A4 = 1.19427e−04
A10 = −8.23559e−09

7th surface

K = 0.000   A6 = −9.25392e−06   A8 = 2.05789e−07
A4 = −6.50094e−05
A10 = −4.87518e−09

13th surface

K = 0.000   A6 = 6.29834e−07   A8 = −4.11279e−08
A4 = −1.15414e−04
A10 = 1.80602e−09

14th surface

K = 0.000   A6 = −5.35941e−07   A8 = 6.50009e−08
A4 = 1.74009e−04

22nd surface

K = 0.000   A6 = 5.94155e−07   A8 = −2.17593e−08
A4 = −2.75896e−05

23rd surface

K = 0.000   A6 = 9.02919e−08   A8 = −5.56984e−10
A4 = −4.81549e−05

Zoom data

| | Wide angle | Intermediate | Telephoto |
|---|---|---|---|
| Focal length | 4.39 | 9.61 | 21.07 |
| Fno. | 1.36 | 1.78 | 2.29 |
| Angle of field 2ω | 84.63 | 44.79 | 20.51 |
| fb (in air) | 6.77 | 8.90 | 8.10 |
| Lens total length (in air) | 51.81 | 51.24 | 63.73 |
| d3 | 0.30 | 6.14 | 15.00 |
| d11 | 17.00 | 5.20 | 1.13 |
| d22 | 1.61 | 4.86 | 13.36 |
| d24 | 5.24 | 7.37 | 6.57 |

Unit focal length

| f1 = 41.74 | f2 = −7.93 | f3 = 14.08 | f4 = 24.66 |

Example 4

Unit mm

Surface data

| Surface no. | r | d | nd | νd |
|---|---|---|---|---|
| Object plane | ∞ | ∞ | | |
| 1 | 25.157 | 0.60 | 1.94595 | 17.98 |
| 2 | 20.000 | 3.52 | 1.77250 | 49.60 |

-continued

Unit mm

| | | | | |
|---|---|---|---|---|
| 3 | 115.717 | Variable | | |
| 4 | 78.736 | 0.40 | 1.88300 | 40.76 |
| 5 | 7.004 | 4.15 | | |
| 6* | −26.093 | 0.40 | 1.74320 | 49.34 |
| 7* | 41.118 | 1.61 | | |
| 8 | 44.604 | 1.37 | 1.94595 | 17.98 |
| 9 | −62.307 | Variable | | |
| 10(stop) | ∞ | 0.10 | | |
| 11* | 9.227 | 2.60 | 1.85135 | 40.10 |
| 12* | 961.126 | 0.10 | | |
| 13 | 18.170 | 0.40 | 1.76182 | 26.52 |
| 14 | 17.828 | 0.10 | | |
| 15 | 10.323 | 0.75 | 1.88300 | 40.76 |
| 16 | 9.568 | 0.40 | 1.80810 | 22.76 |
| 17 | 6.286 | 2.45 | | |
| 18 | −25.701 | 0.40 | 1.78472 | 25.68 |
| 19 | 9.205 | 2.18 | 1.59201 | 67.02 |
| 20 | −21.267 | 0.10 | | |
| 21 | −481.785 | 1.47 | 1.74320 | 49.34 |
| 22* | −16.676 | Variable | | |
| 23* | 11.790 | 2.20 | 1.49700 | 81.54 |
| 24 | 70.000 | Variable | | |
| 25 | ∞ | 0.30 | 1.51633 | 64.14 |
| 26 | ∞ | 0.50 | | |
| 27 | ∞ | 0.50 | 1.51633 | 64.14 |
| 28 | ∞ | 0.50 | | |
| Image plane (Image pickup surface) | ∞ | | | |

Aspherical surface data

6th surface

K = 0.000          A6 = −8.86231e−07          A8 = 6.04505e−08
A4 = −9.16653e−05
A10 = −2.40563e−09

7th surface

K = 0.000          A6 = 1.05144e−06          A8 = −4.52591e−08
A4 = −2.28373e−04
A10 = −7.44012e−10

11th surface

K = 0.000          A6 = 1.59146e−07          A8 = −2.07857e−08
A4 = −9.21278e−05
A10 = 3.49112e−10

12th surface

K = 0.000          A6 = −3.99859e−07          A8 = 1.39955e−08
A4 = 1.21111e−04

22nd surface

K = 0.000          A6 = −1.30176e−07          A8 = −1.55534e−08
A4 = −5.72085e−05

23rd surface

K = 0.000          A6 = −2.90721e−08          A8 = 1.22122e−08
A4 = −4.70865e−05

Zoom data

| | Wide angle | Intermediate | Telephoto |
|---|---|---|---|
| Focal length | 4.40 | 9.64 | 21.12 |
| Fno. | 1.31 | 1.74 | 2.14 |
| Angle of field 2ω | 84.28 | 45.20 | 20.62 |
| fb (in air) | 7.46 | 9.67 | 8.85 |
| Lens total length (in air) | 54.58 | 50.81 | 63.23 |
| d3 | 0.30 | 4.97 | 15.73 |
| d9 | 20.00 | 5.80 | 1.45 |
| d22 | 1.52 | 5.06 | 11.90 |
| d24 | 5.93 | 8.14 | 7.32 |

-continued

Unit mm

Unit focal length

| f1 = 43.83 | f2 = −8.58 | f3 = 14.57 | f4 = 28.17 |
|---|---|---|---|

Example 5

Unit mm

Surface data

| Surface no. | r | d | nd | vd |
|---|---|---|---|---|
| Object plane | ∞ | ∞ | | |
| 1 | 34.874 | 0.60 | 1.84666 | 23.78 |
| 2 | 23.000 | 3.32 | 1.72916 | 54.68 |
| 3 | −1623.950 | Variable | | |
| 4 | 160.470 | 0.70 | 1.88300 | 40.76 |
| 5 | 8.129 | 4.44 | | |
| 6 | −19.449 | 0.60 | 1.88300 | 40.76 |
| 7 | 137.985 | 0.20 | | |
| 8 | 27.973 | 1.56 | 1.92286 | 18.90 |
| 9 | −57.426 | Variable | | |
| 10 (stop) | ∞ | 0.10 | | |
| 11* | 8.864 | 2.18 | 1.80610 | 40.92 |
| 12* | −504.359 | 0.10 | | |
| 13 | 9.101 | 1.87 | 1.88300 | 40.76 |
| 14 | 26.858 | 0.40 | 1.80810 | 22.76 |
| 15 | 5.256 | 1.68 | | |
| 16 | −272.485 | 0.40 | 1.63980 | 34.46 |
| 17 | 5.823 | 2.07 | 1.58313 | 59.38 |
| 18* | −14.409 | Variable | | |
| 19 | −20.194 | 0.40 | 1.58313 | 59.38 |
| 20 | −72.300 | Variable | | |
| 21* | 13.496 | 1.90 | 1.52542 | 55.78 |
| 22 | −212.583 | Variable | | |
| 23 | ∞ | 0.30 | 1.51633 | 64.14 |
| 24 | ∞ | 0.50 | | |
| 25 | ∞ | 0.50 | 1.51633 | 64.14 |
| 26 | ∞ | 0.50 | | |
| Image plane (Image pickup surface) | ∞ | | | |

Aspherical surface data

11th surface

K = 0.000          A6 = 2.48500e−07          A8 = −2.76236e−08
A4 = −1.31263e−04

12th surface

K = 0.000          A6 = 5.97819e−07          A8 = −1.52721e−08
A4 = 7.34259e−05

18th surface

K = 0.000          A6 = 2.52488e−06          A8 = −1.36211e−07
A4 = 1.82493e−05

21st surface

K = 0.000          A6 = −4.80291e−08          A8 = 5.71453e−08
A4 = −3.92135e−05

Zoom data

| | Wide angle | Intermediate | Telephoto |
|---|---|---|---|
| Focal length | 5.06 | 11.08 | 24.29 |
| Fno. | 1.62 | 2.13 | 2.94 |
| Angle of field 2ω | 76.35 | 38.79 | 17.62 |
| fb (in air) | 5.45 | 7.93 | 3.72 |
| Lens total length (in air) | 51.78 | 48.87 | 57.38 |
| d3 | 0.30 | 6.80 | 16.00 |
| d9 | 20.63 | 7.04 | 1.49 |

-continued

Unit mm

| | | | |
|---|---|---|---|
| d18 | 1.20 | 2.12 | 12.45 |
| d20 | 1.68 | 2.46 | 1.20 |
| d22 | 3.92 | 6.40 | 2.20 |

Unit focal length f1 = 50.92　f2 = −9.89　f3 = 11.78　f4 = −48.19　f5 = 24.22

Example 6

Unit mm

Surface data

| Surface no. | r | d | nd | νd |
|---|---|---|---|---|
| Object plane | ∞ | ∞ | | |
| 1 | 25.560 | 0.60 | 1.94595 | 17.98 |
| 2 | 20.000 | 3.03 | 1.72916 | 54.68 |
| 3 | 368.464 | Variable | | |
| 4 | 137.850 | 0.40 | 1.88300 | 40.76 |
| 5 | 7.513 | 4.00 | | |
| 6 | −20.769 | 0.40 | 1.88300 | 40.76 |
| 7 | 59.452 | 0.10 | | |
| 8 | 20.577 | 1.46 | 1.94595 | 17.98 |
| 9 | −128.295 | Variable | | |
| 10 (stop) | ∞ | 0.10 | | |
| 11* | 8.479 | 2.16 | 1.85135 | 40.10 |
| 12* | 651.837 | 0.10 | | |
| 13 | 9.890 | 1.71 | 2.00100 | 29.13 |
| 14 | 26.407 | 0.40 | 1.92286 | 20.88 |
| 15 | 5.352 | 1.13 | | |
| 16 | 15.498 | 0.40 | 1.78472 | 25.68 |
| 17 | 6.743 | 2.80 | 1.59201 | 67.02 |
| 18* | −15.973 | Variable | | |
| 19 | 320.997 | 0.40 | 1.49700 | 81.54 |
| 20* | 8.351 | Variable | | |
| 21* | 9.152 | 1.70 | 1.58313 | 59.38 |
| 22 | 100.000 | Variable | | |
| 23 | ∞ | 0.30 | 1.51633 | 64.14 |
| 24 | ∞ | 0.50 | | |
| 25 | ∞ | 0.50 | 1.51633 | 64.14 |
| 26 | ∞ | 0.50 | | |
| Image plane (Image pickup surface) | ∞ | | | |

Aspherical surface data

11th surface

K = 0.000　A6 = 1.79378e−06　A8 = −1.48060e−08
A4 = −1.43410e−04

12th surface

K = 0.000　A6 = 2.96546e−06　A8 = −2.98199e−08
A4 = 1.27989e−04

18th surface

K = 0.000　A6 = −9.00192e−07　A8 = 1.68214e−08
A4 = −1.63967e−04

20th surface

K = 0.000　A6 = 2.92596e−06　A8 = −8.64059e−07
A4 = 1.56603e−04

21st surface

K = 0.000　A6 = 5.81309e−07　A8 = −2.56900e−08
A4 = 2.55327e−05
A10 = −7.70280e−10

-continued

Unit mm

Zoom data

| | Wide angle | Intermediate | Telephoto |
|---|---|---|---|
| Focal length | 5.06 | 11.08 | 24.29 |
| Fno. | 1.53 | 1.87 | 2.44 |
| Angle of field 2ω | 76.31 | 38.94 | 17.63 |
| fb (in air) | 4.82 | 6.54 | 4.96 |
| Lens total length (in air) | 48.47 | 46.45 | 51.72 |
| d3 | 0.30 | 6.50 | 14.01 |
| d9 | 19.28 | 7.62 | 1.86 |
| d18 | 1.20 | 2.29 | 5.50 |
| d20 | 2.00 | 2.61 | 4.52 |
| d22 | 3.29 | 5.01 | 3.44 |

Unit focal length f1 = 40.94　f2 = −8.80　f3 = 10.12　f4 = −17.26　f5 = 17.16

Example 7

Unit mm

Surface data

| Surface no. | r | d | nd | νd |
|---|---|---|---|---|
| Object plane | ∞ | ∞ | | |
| 1 | 24.091 | 0.60 | 1.94595 | 17.98 |
| 2 | 19.000 | 3.44 | 1.77250 | 49.60 |
| 3 | 98.244 | Variable | | |
| 4 | 70.756 | 0.40 | 1.88300 | 40.76 |
| 5 | 7.213 | 4.43 | | |
| 6* | −27.371 | 0.40 | 1.74320 | 49.34 |
| 7* | 58.476 | 1.65 | | |
| 8 | 47.768 | 1.32 | 1.94595 | 17.98 |
| 9 | −74.155 | Variable | | |
| 10 (stop) | ∞ | 0.10 | | |
| 11* | 8.462 | 2.35 | 1.85135 | 40.10 |
| 12* | −314.277 | 0.10 | | |
| 13 | 43.533 | 0.40 | 1.50000 | 82.00 |
| 14 | 43.570 | 0.10 | | |
| 15 | 11.985 | 1.08 | 1.88300 | 40.76 |
| 16 | 20.634 | 0.40 | 1.80810 | 22.76 |
| 17 | 5.882 | 2.06 | | |
| 18 | 21.641 | 0.40 | 1.80810 | 22.76 |
| 19 | 8.617 | 2.20 | 1.59201 | 67.02 |
| 20* | −12.460 | Variable | | |
| 21 | 29.060 | 0.40 | 1.49700 | 81.54 |
| 22 | 11.076 | Variable | | |
| 23* | 11.866 | 2.50 | 1.58313 | 59.38 |
| 24 | 30.000 | Variable | | |
| 25 | ∞ | 0.30 | 1.51633 | 64.14 |
| 26 | ∞ | 0.50 | | |
| 27 | ∞ | 0.50 | 1.51633 | 64.14 |
| 28 | ∞ | 0.50 | | |
| Image plane (Image pickup surface) | ∞ | | | |

Aspherical surface data

6th surface

K = 0.000　A6 = 5.19733e−06　A8 = −6.51661e−08
A4 = −3.39844e−04
A10 = −1.19572e−09

7th surface

K = 0.000　A6 = 7.16550e−06　A8 = −1.58783e−07
A4 = −4.37848e−04
A10 = 4.72220e−10

-continued

Unit mm

11th surface

K = 0.000          A6 = 7.17284e−07    A8 = −5.09185e−08
A4 = −1.21595e−04
A10 = 4.84229e−10

12th surface

K = 0.000          A6 = −3.33881e−07   A8 = −4.07449e−09
A4 = 1.96881e−04

20th surface

K = 0.000          A6 = −1.17742e−07   A8 = −4.27695e−08
A4 = 2.78021e−05

23rd surface

K = 0.000          A6 = 2.24442e−06    A8 = −9.44010e−08
A4 = −1.44164e−04

Zoom data

|  | Wide angle | Intermediate | Telephoto |
|---|---|---|---|
| Focal length | 4.34 | 9.50 | 20.83 |
| Fno. | 1.37 | 1.67 | 2.02 |
| Angle of field 2ω | 84.99 | 44.23 | 20.16 |
| fb (in air) | 2.83 | 2.83 | 2.82 |
| Lens total length (in air) | 50.90 | 44.87 | 54.39 |
| d3 | 0.30 | 5.26 | 16.00 |
| d9 | 19.75 | 5.53 | 1.10 |
| d20 | 2.14 | 4.37 | 2.00 |
| d22 | 1.54 | 2.54 | 8.12 |
| d24 | 1.30 | 1.30 | 1.30 |

Unit focal length f1 = 43.58   f2 = −9.13   f3 = 10.62   f4 = −36.26   f5 = 32.02

Aberration diagrams of the embodiments from the first embodiment to the seventh embodiment are shown in diagrams from FIG. 8A to FIG. 14L, In the aberration diagrams, 'ω' denotes a half angle of field.

In the aberration diagrams, diagrams shown by diagram numbers ending with alphabets suffix A, B, C, and D indicate spherical aberration (SA), astigmatism (AS), distortion (DT), and chromatic aberration of magnification (CC) in a wide angle end state.

Moreover, diagrams shown by diagram numbers ending with alphabets suffix E, F, G, and H indicate spherical aberration (SA), astigmatism (AS), distortion (DT), and chromatic aberration of magnification (CC) in an intermediate focal length state.

Furthermore, diagrams shown by diagram numbers ending with alphabets suffix I, J, K, and L indicate spherical aberration (SA), astigmatism (AS), distortion (DT), and chromatic aberration of magnification (CC) in a telephoto end state.

Next, values of conditional expressions (1) to (22) in each of the embodiments are given in table 1. '--' indicate that the value is not applicable to that conditional expression.

Conditional Expressions (1) Fno(W)
(2) f2/ft
(3) ft/fw
(4) Δ1G/ft
(5) β3(T)/β3(W)
(6) D(T)/ft
(7) Fno(T)
(8) f1/ft
(9) (β2(T)/β2(W))/(β3(T)/β3(W))
(10) f2/f3
(11) f3/ft
(12) Σd/ft
(13) f_3G1/f_3G3
(14) f_3G2/f_3G3
(15) f_3G1/f_3G2
(16) f_3G1/f_3G4
(17) f_3G3/f_3G4
(18) |f_3G1/f_3G2|
(19) (nd_ce−L)−(nd_ce−R)
(20) (vd_ce−L)−(vd_ce−R)
(21) |vdp−vdn|
(22) ΔLG/ft

TABLE 1

| Conditional expressions | Example 1 | Example 2 | Example 3 | Example 4 |
|---|---|---|---|---|
| (1) | 1.63 | 1.45 | 1.36 | 1.31 |
| (2) | −0.39 | −0.38 | −0.38 | −0.41 |
| (3) | 4.80 | 4.80 | 4.80 | 4.80 |
| (4) | 0.32 | 0.42 | 0.57 | 0.41 |
| (5) | 3.41 | 2.85 | 2.71 | 2.69 |
| (6) | 2.45 | 2.98 | 3.02 | 2.99 |
| (7) | 2.71 | 2.42 | 2.29 | 2.14 |
| (8) | 1.87 | 1.94 | 1.98 | 2.08 |
| (9) | 0.54 | 0.68 | 0.71 | 0.72 |
| (10) | −0.71 | −0.58 | −0.56 | −0.59 |
| (11) | 0.54 | 0.66 | 0.67 | 0.69 |
| (12) | 0.90 | 1.20 | 1.24 | 1.19 |
| (13) | 0.17 | −0.50 | −0.07 | −0.48 |
| (14) | −0.37 | −5.84 | 0.14 | 110.16 |
| (15) | — | 0.08 | −0.48 | 0.00 |
| (16) | — | 0.18 | 0.26 | −0.24 |
| (17) | — | −0.36 | −3.79 | 0.49 |
| (18) | — | — | — | −0.004 |
| (19) | 0.07 | 0.07 | 0.08 | 0.07 |
| (20) | 18.00 | 18.00 | 6.56 | 18.00 |
| (21) | 24.92 | 33.96 | 44.26 | 41.34 |
| (22) | 0.16 | 0.10 | 0.06 | 0.07 |

| Conditional expressions | Example 5 | Example 6 | Example 7 |
|---|---|---|---|
| (1) | 1.62 | 1.53 | 1.37 |
| (2) | −0.41 | −0.36 | −0.44 |
| (3) | 4.80 | 4.80 | 4.80 |
| (4) | 0.23 | 0.13 | 0.17 |
| (5) | 2.74 | 2.35 | 2.07 |
| (6) | 2.36 | 2.13 | 2.61 |
| (7) | 2.94 | 2.44 | 2.02 |
| (8) | 2.10 | 1.69 | 2.09 |
| (9) | 0.62 | 0.80 | 0.97 |
| (10) | −0.84 | −0.87 | −0.86 |
| (11) | 0.48 | 0.42 | 0.51 |
| (12) | 0.92 | 0.86 | 1.16 |
| (13) | 0.31 | 0.58 | −0.58 |
| (14) | −0.71 | −1.04 | −1320.87 |
| (15) | — | — | 0.00 |
| (16) | — | — | 0.57 |
| (17) | — | — | −0.99 |
| (18) | — | — | — |
| (19) | 0.07 | 0.08 | 0.07 |
| (20) | 18.00 | 8.25 | 18.00 |
| (21) | 24.92 | 41.34 | 44.26 |
| (22) | −0.07 | 0.01 | 0.00 |

Figure 15:
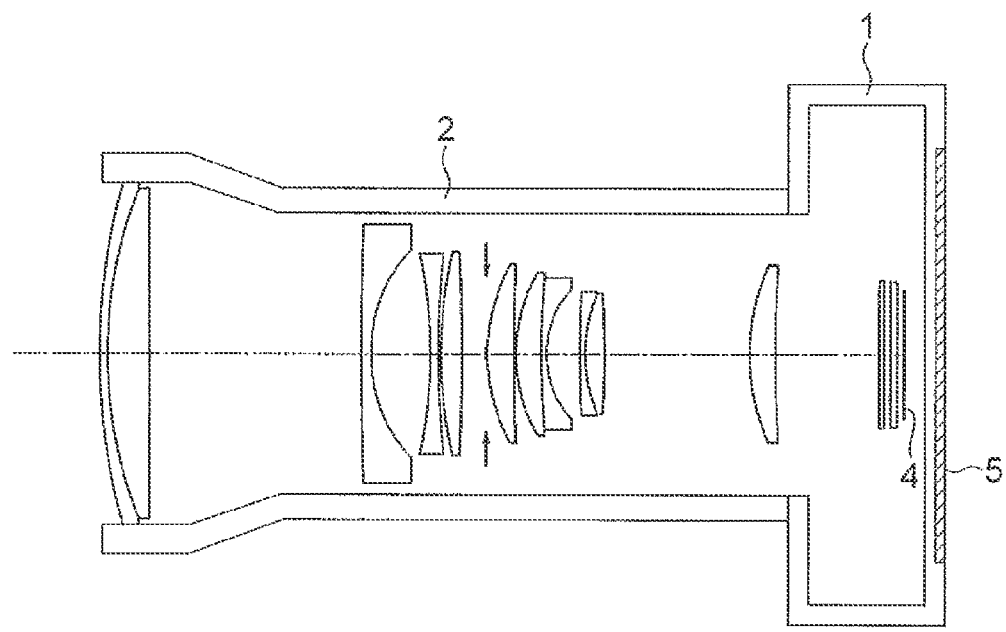
FIG. 15 is a cross-sectional view of a compact camera as an image pickup apparatus in which a small-size CCD or CMOS has been used as an image pickup element, using the zoom lens according to the present invention.

FIG. 15 is a cross-sectional view of a compact camera as an image pickup apparatus. In FIG. 15, reference numeral 1 denotes the compact camera, reference numeral 2 denotes a taking lens system which has been disposed inside a lens barrel. Moreover, reference numeral 4 denotes an image pickup element surface, and reference numeral 5 denotes a back monitor. As an image pickup element, a small-size CCD or CMOS has been used.

As the taking lens system 2 of the compact camera 1, the zoom lens according to the present invention such as the zoom lens described in any of the embodiments from the first embodiment to the seventh embodiment is to be used.

Figure 16:
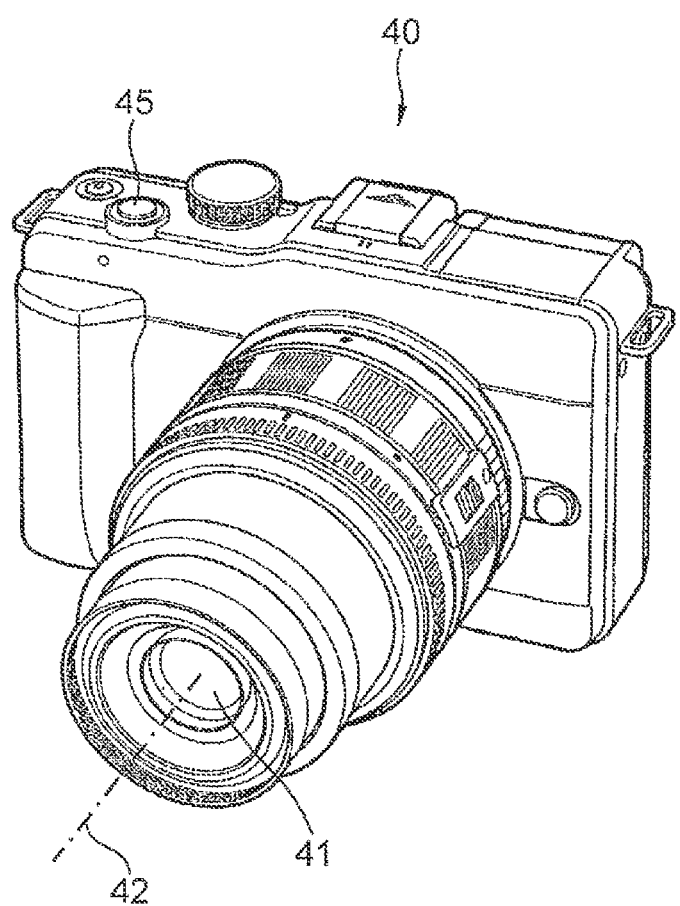
FIG. 16 is a front perspective view showing an appearance of a digital camera as an image pickup apparatus.
Figure 17:
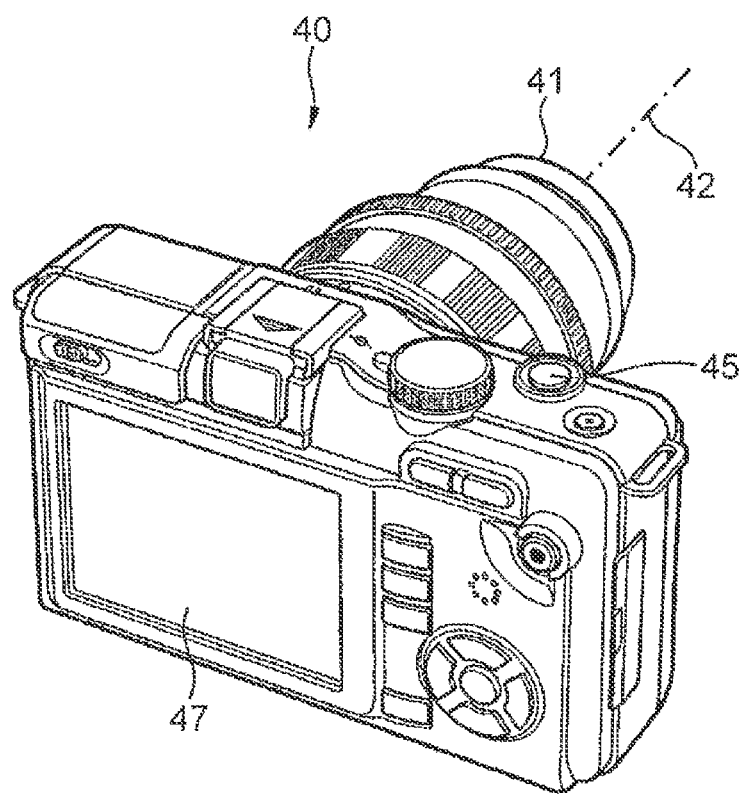
FIG. 17 is a rear perspective view showing an appearance of the digital camera as an image pickup apparatus.

FIG. 16 and FIG. 17 show conceptual diagrams of a structure of the image pickup apparatus according to the present invention. FIG. 16 is a front perspective view showing an appearance of a digital camera 40 as the image pickup apparatus, and FIG. 16 is a rear perspective view of the digital camera 40. The zoom lens according to the present invention has been used in a photographic optical system 41 of the digital camera 40.

The digital camera 40 according to the present invention includes components such as the photographic optical system 41 positioned in a photographic optical path 42, a shutter button 45, and a liquid-crystal display monitor 47. As the shutter button 45 disposed on an upper portion of the digital camera 40 is pressed, in conjunction with pressing of the shutter button 45, a photograph is taken through the photographic optical system 41 such as the zoom lens according to the first embodiment. An object image which has been formed by the photographic optical system 41 is formed on an image pickup element (opto-electric conversion surface) provided near an image forming surface. The object image which has been received by the image pickup element is displayed as an electronic image on the liquid-crystal display monitor 47 provided on a rear surface of the digital camera 40, by a processing unit. Moreover, it is possible to record the electronic image which has been captured in a recording unit.

Figure 18:
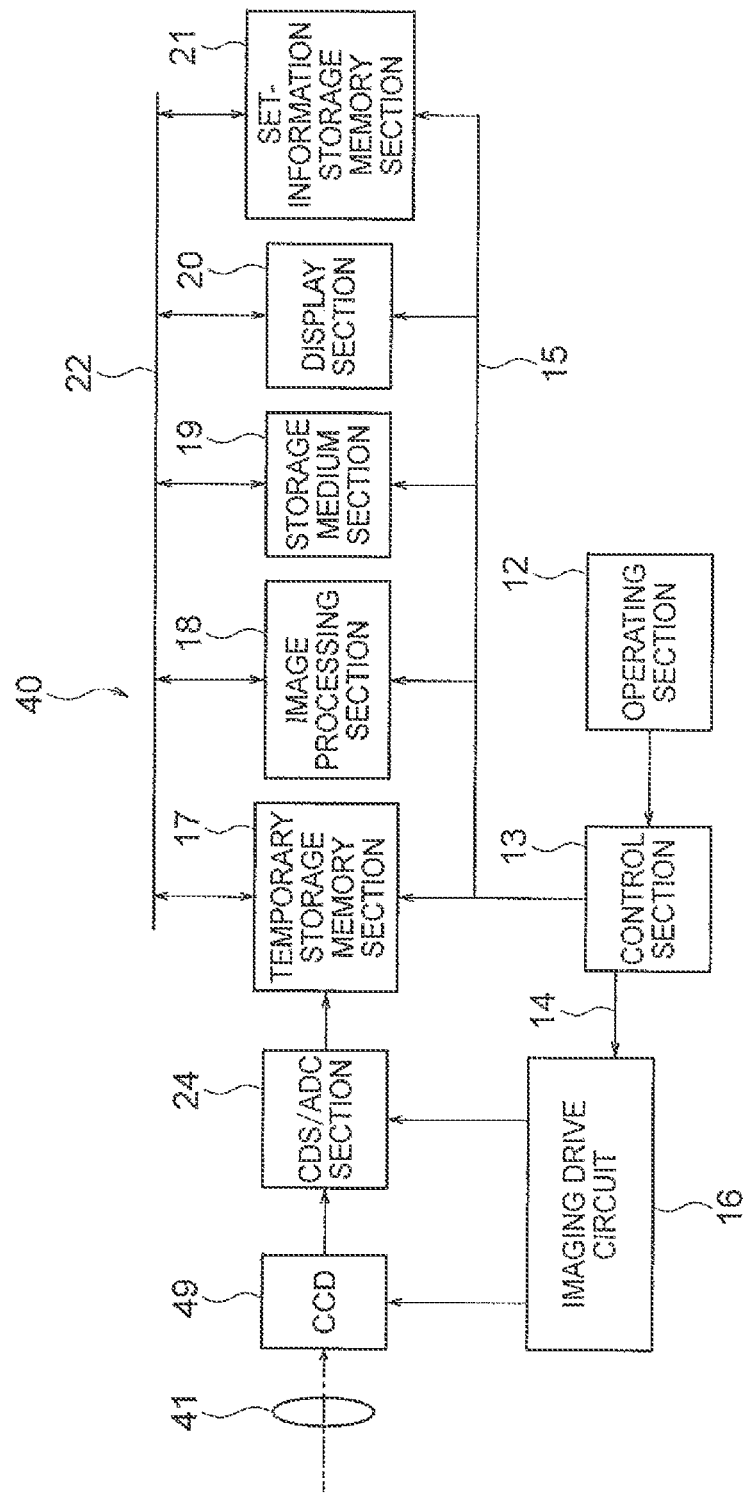
FIG. 18 is a block diagram showing an internal circuit of main sections of the digital camera.

FIG. 18 is a block diagram showing an internal circuit of main sections of the digital camera 40. In the following description, the processing unit mentioned above includes components such as a CDS/ADC (correlated double sampling/analog-to-digital converter) section 24, a temporary storage memory 17, and an image processing section 18. A storage unit includes components such as a storage medium section 19.

As shown in FIG. 18, the digital camera 40 includes an operating section 12, a control section 13 which is connected to the operating section 12, the temporary storage memory 17 and an imaging drive circuit 16 which are connected to a control-signal output port of the control section 13 via a bus 14 and a bus 15, the image processing section 18, the storage medium section 19, the display section 20, and a set-information storage memory section 21.

The temporary storage memory 17, the image processing section 18, the storage medium section 19, the display section 20, and the set-information storage memory section 21 are capable of inputting and outputting data mutually via a bus 22. Moreover, a CCD 49 and the CDS/ADC section 24 are connected to the imaging drive circuit 16.

The operating section 12 includes various input buttons and switches, and informs event information which has been input from outside (by a user of camera) via the input buttons and switches, to the control section 13. The control section 13 is a central processing unit (CPU) and has a built-in computer program memory which is not shown in the diagram. The control section 13 controls the overall digital camera 40 according to a computer program which has been stored in the computer program memory.

The CCD 49 is an image pickup element which is controlled and driven by the imaging drive circuit 16, and outputs to the CDS/ADC section 24 an amount of light for each pixel of the object image which has been formed via the photographic optical system 41, upon converting to an electric signal.

The CDS/ADC section 24 is a circuit which amplifies the electric signal which is input from the CCD 49, and upon carrying out analog-to-digital conversion, outputs an image raw data (Bayer data, hereinafter called as 'raw data') which has been amplified and converted to digital (data), to the temporary storage memory 17.

The temporary storage memory 17 is a buffer which includes an SDRAM (synchronous dynamic random access memory), and is a memory unit which stores temporarily the RAW data which has been output from the CDS/ADC section 24. The image processing section 18 is a circuit which reads out the RAW data which has been stored in the temporary storage memory 17 or the RAW data which has been stored in storage medium section 19, and carries out electrically various image processing including distortion correction based on image-quality parameters which have been specified by the control section 13.

The storage medium section 19 has a storage medium of a card-type or a stick-type which is made of a memory such as a flash memory, mounted detachably, and records and holds RAW data which is transmitted from the temporary storage memory 17 and image data which has been subjected to image processing by the image processing section 18, in the flash memory.

The display section 20 includes the liquid-crystal display monitor 47, and displays an operation menu, image data, and RAW data captured. The set-information storage memory section 21 is provided with a ROM section in which various image-quality parameters have been stored in advance and a RAM section which stores image-quality parameters which have been read out from the ROM section by an input operation of the operating section 12.

By adopting the zoom lens according to the present invention as the photographic optical system 41 in the digital camera 40, it is possible to let the digital camera 40 which has been structured in such manner to be an image pickup apparatus which is advantageous for achieving a high-resolution image without degrading the image quality, while having a wide angle of field and small size.

As it has been described above, the zoom lens and the image pickup apparatus according to the present invention have a fast lens, and are compact with a short overall length of the optical system, and are useful in a case of having favorable aberration performance.

According to the present invention, it is possible to provide a zoom lens which is fast and small-size, and which has a favorable image forming performance, and an image pickup apparatus which includes such zoom lens.

What is claimed is:

1. A zoom lens comprising in order from an object side:
a first lens unit having a positive refractive power;
a second lens unit having a negative refractive power;
a third lens unit having a positive refractive power; and
a rear lens group, including one or more additional lens unit(s);
wherein
at the time of zooming from a wide angle end to a telephoto end, the first lens unit moves, and
the zoom lens satisfies the following conditional expressions (1), (3)' and (8)

$$FNO(W) < 1.64 \quad (1)$$

$$3.4 < ft/fw \quad (3)'$$

$$1 < f1/ft < 2.3 \quad (8)$$

where,
FNO(W) denotes an F-number of the zoom lens at the wide angle end, ft denotes a focal length of the overall zoom lens system at the telephoto end,
fw denotes a focal length of the overall zoom lens system at the wide angle end, and
f1 denotes a focal length of the first lens unit.

2. The zoom lens according to claim 1, wherein the zoom lens satisfies the following conditional expression (2)

$$-0.8 < f2/ft < -0.32 \quad (2)$$

where,
f2 denotes a focal length of the second lens unit, and
ft denotes a focal length of the overall zoom lens system at the telephoto end.

3. The zoom lens according to claim 1, wherein the zoom lens satisfies the following conditional expression (4)

$$\Delta 1G/ft < 0.75 \quad (4)$$

where,
$\Delta 1G$ denotes an amount of movement of the first lens unit when zoomed from the wide angle end to the telephoto end, and
ft denotes a focal length of the overall zoom lens system at the telephoto end.

4. The zoom lens according to claim 1, wherein the third lens unit includes not less than four lenses.

5. The zoom lens according to claim 1, wherein the zoom lens satisfies the following conditional expression (5)

$$2 < \beta 3(T)/\beta 3(W) \quad (5)$$

where,
$\beta 3(W)$ denotes a lateral magnification of the third lens unit at the wide angle end, and
$\beta 3(T)$ denotes a lateral magnification of the third lens unit at the telephoto end.

6. The zoom lens according to claim 1, wherein the zoom lens satisfies the following conditional expression (6)

$$D(T)/ft < 4 \quad (6)$$

where,
D(T) denotes a total length of the zoom lens at the telephoto end, and
ft denotes a focal length of the overall zoom lens system at the telephoto end.

7. The zoom lens according to claim 1, wherein the zoom lens satisfies the following conditional expression (7)

$$FNO(T) < 3.5 \quad (7)$$

where,
FNO(T) denotes an F-number of the zoom lens at the telephoto end.

8. The zoom lens according to claim 1, wherein the zoom lens satisfies the following conditional expression (9)

$$0.3 < (\beta 2(T)/(\beta 2(W))/(\beta 3(T)/(\beta 3(W)) < 1.2 \quad (9)$$

where,
$\beta 2(W)$ denotes a lateral magnification of the second lens unit at the wide angle end,
$\beta 2(T)$ denotes a lateral magnification of the second lens unit at the telephoto end,
$\beta 3(W)$ denotes a lateral magnification of the third lens unit at the wide angle end, and
$\beta 3(T)$ denotes a lateral magnification of the third lens unit at the telephoto end.

9. The zoom lens according to claim 1, wherein the zoom lens satisfies the following conditional expression (10)

$$-1.2 < f2/f3 < -0.4 \quad (10)$$

where,
f2 denotes a focal length of the second lens unit, and
f3 denotes a focal length of the third lens unit.

10. The zoom lens according to claim 1, wherein the zoom lens satisfies the following conditional expression (11)

$$0.36 < f3/ft < 0.8 \quad (11)$$

where,
f3 denotes a focal length of the third lens unit, and
ft denotes a focal length of the overall zoom lens system at the telephoto end.

11. The zoom lens according to claim 1,
wherein the rear lens group includes a lens unit having a positive refractive power which is nearest to an image side, and which differs from the third lens unit.

12. The zoom lens according to claim 1, wherein the zoom lens satisfies the following conditional expression (12)

$$\Sigma d/ft < 2 \quad (12)$$

where,
$\Sigma d$ denotes a total thickness of the zoom lens, and
ft denotes a focal length of the overall zoom lens system at the telephoto end.

13. The zoom lens according to claim 1, wherein the third lens unit comprises not less than five lens components.

14. An image pickup apparatus comprising:
a zoom lens according to claim 1, and
an image pickup element which is disposed at an image side of the zoom lens, and which converts an optical image formed by the zoom lens to an electric signal.

15. The zoom lens according to claim 1, wherein the third lens unit comprises not less than four lens components.

16. The zoom lens according to claim 15, wherein the zoom lens satisfies the following conditional expression (15)

$$-0.62 < f\_3G1/f\_3G2 \quad (15)$$

where,
f_3G1 denotes a focal length of a first lens component in the third lens unit, and
f_3G2 denotes a focal length of a second lens component in the third lens unit.

17. The zoom lens according to claim 15, wherein the zoom lens satisfies the following conditional expression (16)

$$0.1 < f\_3G1/f\_3G4 < 0.7 \quad (16)$$

where,
f_3G1 denotes a focal length of a first lens component in the third lens unit, and
f_3G4 denotes a focal length of a fourth lens component in the third lens unit.

18. The zoom lens according to claim 15, wherein the zoom lens satisfies the following conditional expression (17)

$$-4.0 < f\_3G3/f\_3G4 < 0 \quad (17)$$

where,
f_3G3 denotes a focal length of a third lens component in the third lens unit, and
f_3G4 denotes a focal length of a fourth lens component in the third lens unit.

19. The zoom lens according to claim 15, wherein the third lens unit comprises in order from the object side,
a first lens component which is a positive lens,
a second lens component which is a cemented lens of a positive lens and a negative lens, and
a third lens component which is a cemented lens of a negative lens and a positive lens.

20. The zoom lens according to claim 15, wherein the zoom lens satisfies the following conditional expression (18)

$$|f\_3G1/f\_3G2|<0.4 \qquad (18)$$

where,
f_3G1 denotes a focal length of a first lens component in the third lens unit, and
f_3G2 denotes a focal length of a second lens component in the third lens unit.

21. The zoom lens according to claim 1, wherein the third lens unit comprises not less than three lens components.

22. The zoom lens according to claim 21, wherein the third lens unit has at least one set of cemented lens.

23. The zoom lens according to claim 22, wherein
an object-side surface of the cemented lens has a shape which is convex toward the object side, and
the zoom lens satisfies the following conditional expressions (19) and (20)

$$-0.1<(nd\_ce-L)-(nd\_ce-R) \qquad (19)$$

$$5<(vd\_ce-L)-(vd\_ce-R)<25 \qquad (20)$$

where,
nd_ce−L denotes a refractive index with respect to a d-line of an object-side lens of a cemented lens nearest to the object side, in the third lens unit,
nd_ce−R denotes a refractive index with respect to the d-line of an image-side lens of the cemented lens nearest to the object side, in the third lens unit,
vd_ce−L denotes Abbe's number for the object-side lens of the cemented lens nearest to the object side, in the third lens unit, and
vd_ce−R denotes Abbe's number for the image-side lens of the cemented lens nearest to the object side, in the third lens unit.

24. The zoom lens according to claim 23, wherein the object-side lens of the cemented lens is a positive lens.

25. The zoom lens according to claim 22, wherein a lens component nearest to an image side in the third lens unit is a cemented lens of a negative lens and a positive lens.

26. The zoom lens according to claim 25, wherein the zoom lens satisfies the following conditional expression (21)

$$20<|vdp-vdn| \qquad (21)$$

where,
vdp denotes Abbe's number for the positive lens in the cemented lens, and
vdn denotes Abbe's number for the negative lens in the cemented lens.

27. The zoom lens according to claim 21, wherein the zoom lens satisfies the following conditional expression (13)

$$0<f\_3G1/f\_3G3<0.8 \qquad (13)$$

where,
f_3G1 denotes a focal length of a first lens component in the third lens unit, and
f_3G3 denotes a focal length of a third lens component in the third lens unit.

28. The zoom lens according to claim 21, wherein the zoom lens satisfies the following conditional expression (14)

$$-2<f\_3G2/f\_3G3<0 \qquad (14)$$

where,
f_3G2 denotes a focal length of a second lens component in the third lens unit, and
f_3G3 denotes a focal length of a third lens component in the third lens unit.

29. The zoom lens according to claim 21, wherein the third lens unit comprises in order from an object side
a first lens component which is a positive lens,
a second lens component which is a cemented lens of a positive lens and a negative lens, and
a third lens component which is a cemented lens of a negative lens and a positive lens.

* * * * *